United States Patent
Iezawa et al.

(10) Patent No.: US 9,871,483 B2
(45) Date of Patent: Jan. 16, 2018

(54) CONTROLLER FOR ROTARY ELECTRIC MACHINE DRIVE APPARATUS

(71) Applicant: Mitsubishi Electric Corporation, Tokyo (JP)

(72) Inventors: Masahiro Iezawa, Tokyo (JP); Noriyuki Wada, Tokyo (JP); Hideaki Kawamoto, Tokyo (JP); Daiki Matsuura, Tokyo (JP); Tomoya Tachibana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 15/218,600

(22) Filed: Jul. 25, 2016

(65) Prior Publication Data

US 2017/0264232 A1    Sep. 14, 2017

(30) Foreign Application Priority Data

Mar. 8, 2016    (JP) ................. 2016-044026

(51) Int. Cl.
*H02H 7/09* (2006.01)
*H02P 29/032* (2016.01)
*H02P 27/08* (2006.01)

(52) U.S. Cl.
CPC ........... *H02P 29/032* (2016.02); *H02P 27/08* (2013.01)

(58) Field of Classification Search
USPC .................................................. 318/400.22
See application file for complete search history.

(56) References Cited

U.S. PATENT DOCUMENTS 8,853,989 B2 *  10/2014  Umayahara ......... B60L 11/1887
                                                     318/139
2007/0278986 A1   12/2007  Okamura
(Continued)

FOREIGN PATENT DOCUMENTS

| JP | 2007-325351 A | 12/2007 |
| JP | 2009225633 A | 10/2009 |
| WO | 2013001634 A1 | 1/2013 |

OTHER PUBLICATIONS

Communication dated Dec. 20, 2016 from the Japanese Patent Office in counterpart Japanese application No. 2016-044026.

*Primary Examiner* — Jorge L Carrasquillo
(74) *Attorney, Agent, or Firm* — Sughrue Mion, PLLC; Richard C. Turner

(57) ABSTRACT

There is provided a controller for a rotary electric machine drive apparatus capable of reducing data-processing load and amount of memories required for a data processing which calculates a voltage command value of the converter which reduces power loss. A controller calculates the required minimum voltage which is required in the case of performing a maximum torque/current control is calculated; calculates a converter loss coefficient which is a coefficient of a polynomial representing a power loss characteristic of the converter; calculates an inverter loss coefficient which is a coefficient of a polynomial representing a power loss characteristic of the inverter; calculates a sum total of loss coefficients for each order of polynomials; calculates the low loss voltage which the sum total power loss becomes a minimum, based on the sum total loss coefficients for each order; sets to the voltage command value of the converter.

12 Claims, 19 Drawing Sheets

(56) References Cited

U.S. PATENT DOCUMENTS

2009/0237019 A1    9/2009  Yamakawa et al.
2014/0139156 A1*   5/2014  Hayashi .................. H02P 21/02
                                                    318/400.3
2016/0308475 A1*  10/2016  Morii ................... H02P 27/085

* cited by examiner $$Ploss\_mg2(VH) = A0mg2 + A1mg2 \cdot VH + A2mg2 \cdot VH^2$$

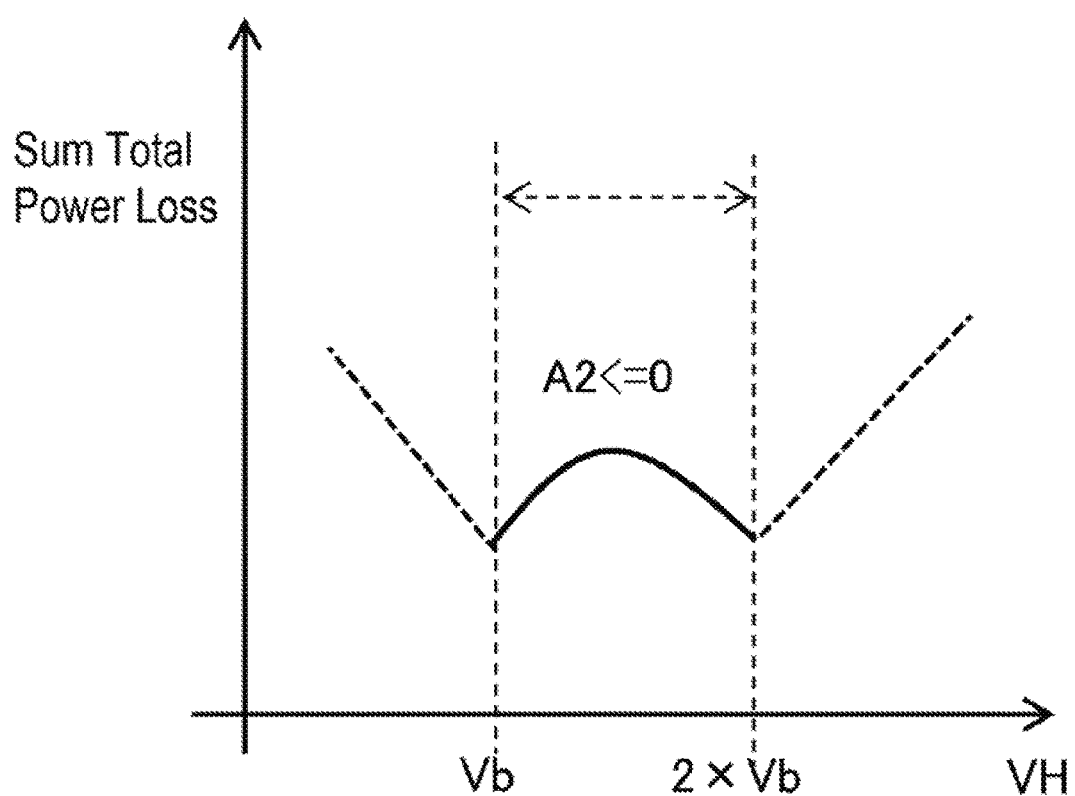

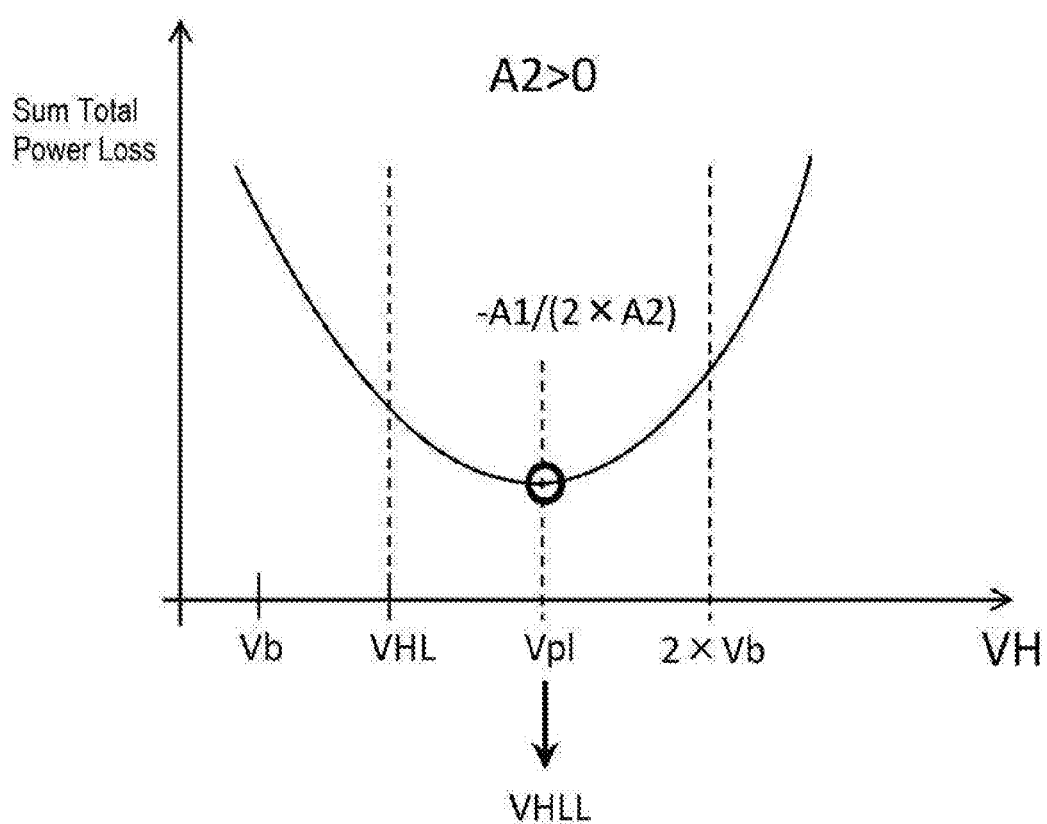

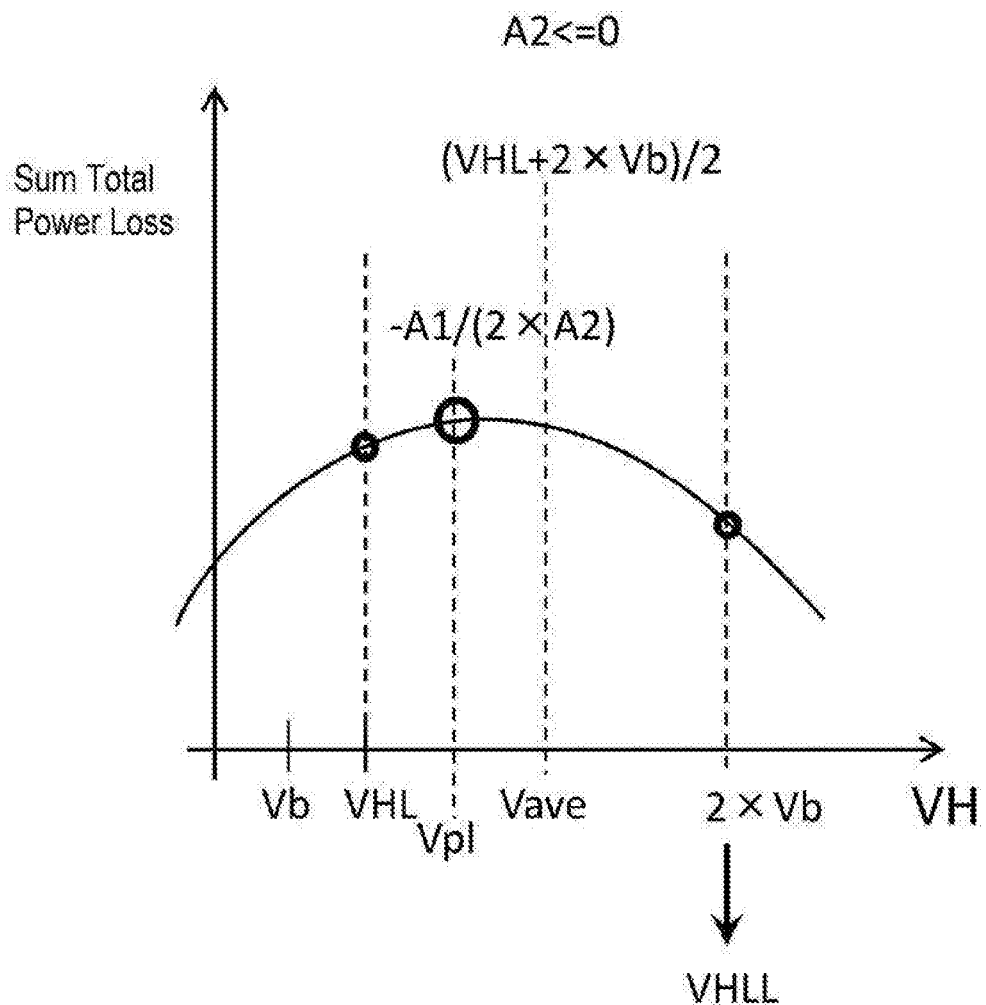

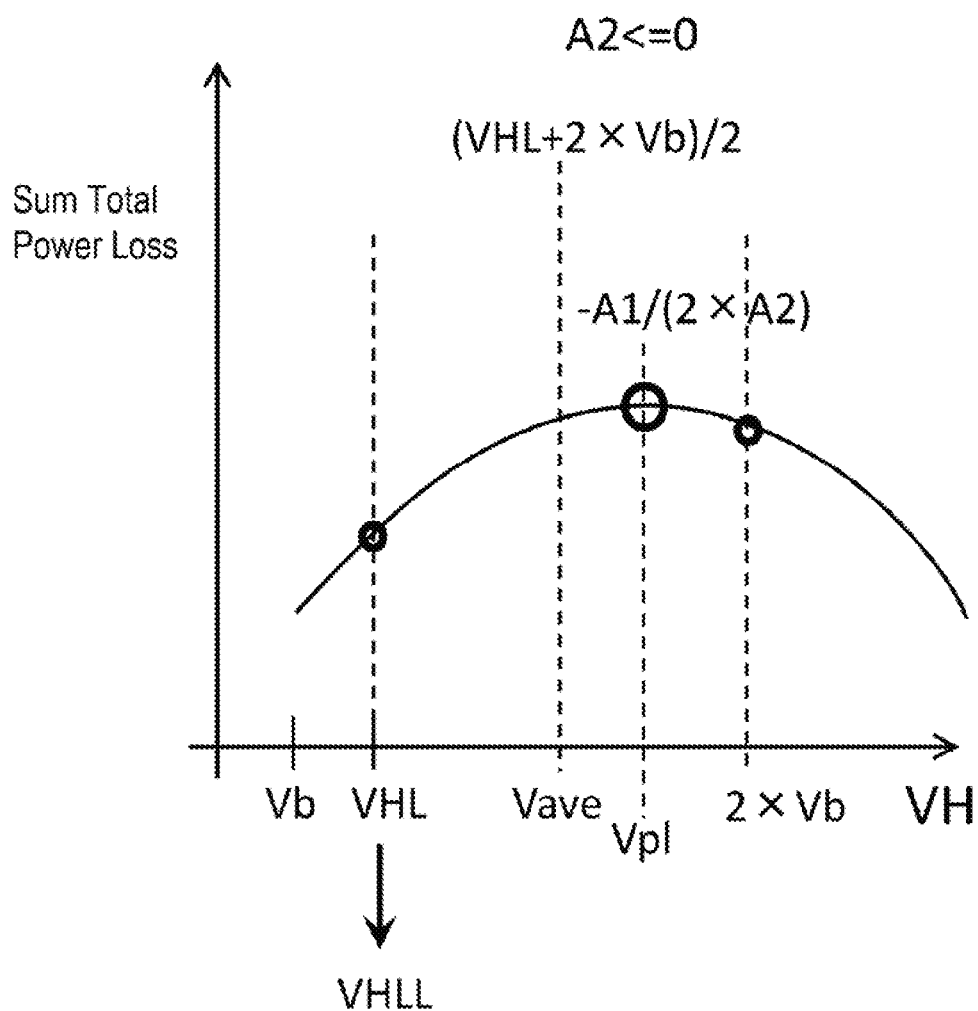

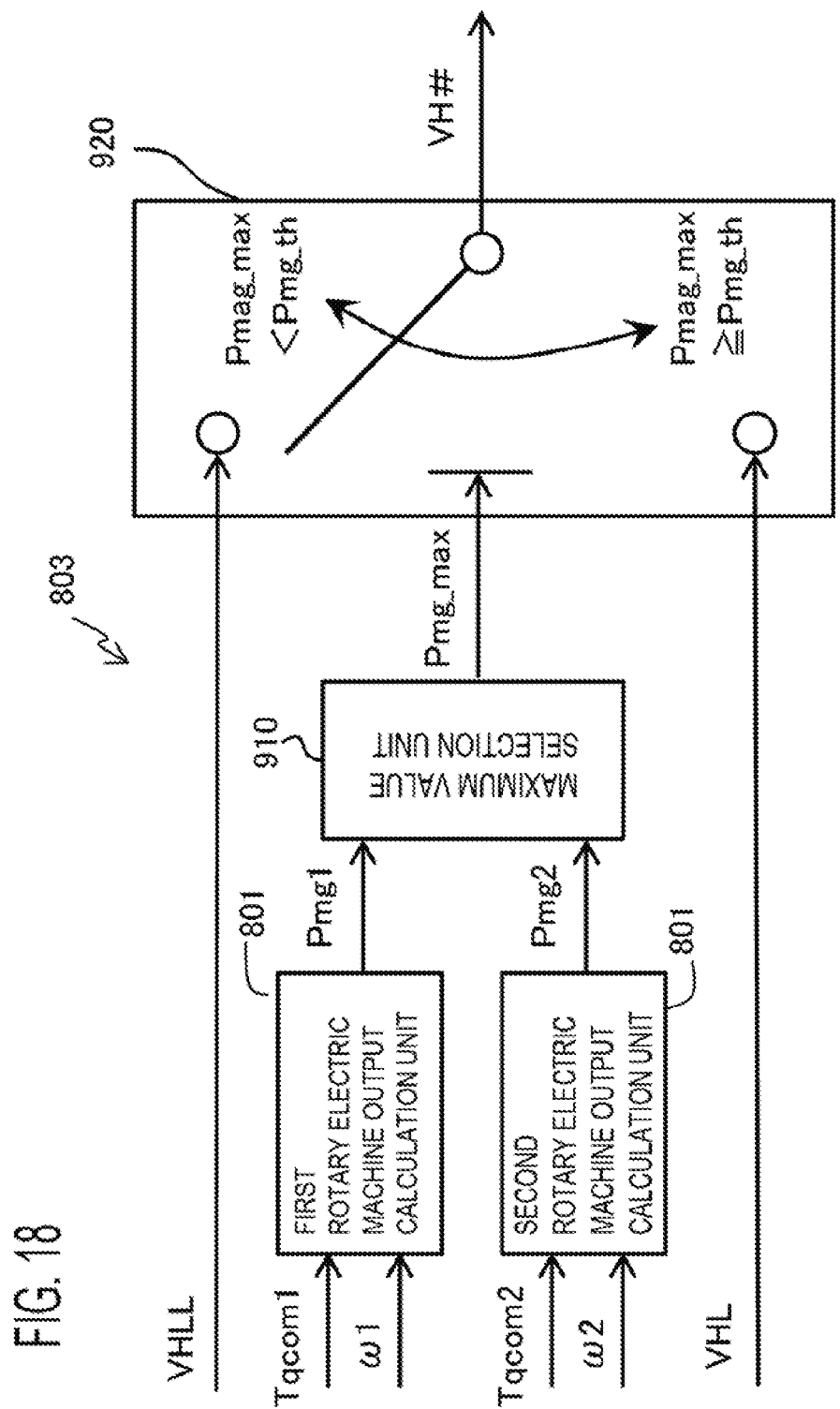

CONTROLLER FOR ROTARY ELECTRIC MACHINE DRIVE APPARATUS

INCORPORATION BY REFERENCE

The disclosure of Japanese Patent Application No. 2016-044026 filed on Mar. 8, 2016 including its specification, claims and drawings, is incorporated herein by reference in its entirety.

BACKGROUND

The present invention relates to a controller for a rotary electric machine drive apparatus that is provided with a converter which can raise a power source voltage of a direct current power source to output to a system voltage line, and an inverter which is provided between the converter and a rotary electric machine and performs power conversion between direct current power of the system voltage line and alternating current power which drives the rotary electric machine.

Concerning the above controller for the rotary electric machine drive apparatus, the technology described in Japanese Patent Application Publication No. 2007-325351 is already known. In JP-A-2007-325351, the rotary electric machine drive apparatus which shares an output voltage of the converter with a plurality of inverters and controls a plurality of rotary electric machines is disclosed. In the technology of JP-A-2007-325351, about each of a plurality of candidates of a voltage command value of the converter, it is configured to calculate a power loss of the direct current power source, a power loss of the converter, power losses of a plurality of inverters, and a sum total power loss of these, and search for a voltage which sum total power becomes a minimum from a plurality of candidate voltages, and set the searched voltage as a voltage command value of the converter. And in the technology of JP-A-2007-325351, it is configured to store map data of each power loss whose arguments are a DC voltage, a rotational speed and a torque of the rotary electric machine, and the like, and calculate each power loss using map data.

SUMMARY

However, in the technology of JP-A-2007-325351, about each of a plurality of voltage candidates, it is necessary to calculate each power loss using map data of each power loss, thus there was a problem that data-processing load becomes large. In order to improve search accuracy, it is necessary to make the number of voltage candidate increase; as the number of voltage candidates increases, data-processing load increases.

In the technology of JP-A-2007-325351, it is necessary to provide the map data of each power loss, thus there was a problem that the amount of memories of storage apparatus becomes large. In particular, depending on a circuit configuration of the converter, a loss characteristic of the converter may not become a monotone increase to the increase of output power of the converter. In such a case, since it is necessary to set map data of power loss of the converter finely for every DC voltage, output voltage of the converter, and output power of the converter, and it is necessary to calculate power loss in a plurality of operating points; there was a problem that amount of memories and data-processing load increase significantly, a high-performance computing processing unit is necessary, and cost of the controller increases.

Thus, it is desirable to provide a controller for a rotary electric machine drive apparatus capable of reducing data-processing load and amount of memories required for a data processing which calculates a voltage command value of the converter which reduces power loss of the rotary electric machine drive apparatus.

According to an aspect of the present invention, a controller for a rotary electric machine drive apparatus equipped with a converter which can raise a power source voltage of a direct current power source to output to a system voltage line, and an inverter which is provided between the converter and a rotary electric machine and performs power conversion between direct current power of the system voltage line and alternating current power which drives the rotary electric machine, the controller for the rotary electric machine drive apparatus includes:

a converter controller that controls the converter so that a system voltage which is a direct current voltage of the system voltage line approaches a voltage command value, in the case where the voltage command value is larger than the power source voltage; and a voltage command calculator which calculates the voltage command value within a range which is larger than or equal to the power source voltage and is smaller than or equal to an output upper limit voltage of the converter;

wherein the voltage command calculator is provided with a required minimum voltage calculator that calculates a required minimum voltage which is a minimum system voltage required in the case of performing a maximum torque/current control of the rotary electric machine under conditions of the present torque command value and the present rotational speed of the rotary electric machine; and a loss minimum command calculator that, in the case where the required minimum voltage is larger than or equal to the power source voltage and is smaller than or equal to the output upper limit voltage of the converter, calculates a converter loss coefficient which is a coefficient of a polynomial in which the system voltage is a variable and represents a power loss characteristic of the converter; calculates an inverter loss coefficient which is a coefficient of a polynomial in which the system voltage is a variable and represents a power loss characteristic of the inverter; calculates a sum total of the converter loss coefficient and the inverter loss coefficient for each order of the polynomials; based on the calculated sum total loss coefficient for each order, calculates a low loss voltage which is the system voltage from which a sum total power loss of the converter and the inverter becomes a minimum, within a candidate voltage range which is larger than or equal to the required minimum voltage and is smaller than or equal to the output upper limit voltage of the converter; and sets the low loss voltage as the voltage command value.

According to the controller for the rotary electric machine drive apparatus according to the present invention, without calculating each power loss using map data about a plurality of voltage candidates, and without searching for the voltage command value which the sum total power loss becomes a minimum; since it is possible to set the voltage command value based on the coefficient of the polynomial representing each power loss characteristic, data-processing load can be reduced. Since each power loss characteristic is approximated by the polynomial, the amount of memories of storage apparatus can be significantly reduced rather than converting the power loss characteristic into map data directly. Therefore, while reducing data-processing load, the sum total power loss of the rotary electric machine drive apparatus can be reduced.

BRIEF DESCRIPTION OF THE DRAWINGS

FIG. 13A and FIG. 13B are figures for explaining a change of the sum total power loss characteristic by positive/negative of the 2nd-order sum total loss coefficient according to Embodiment 1 of the present invention;

FIG. 16 is a figure for explaining a setting of the voltage command value according to a position of the extremum voltage according to Embodiment 1 of the present invention;

FIG. 17A and FIG. 17B are figures for explaining a setting of the voltage command value according to a position of the extremum voltage according to Embodiment 1 of the present invention;

FIG. 18 is a block diagram of an algorithm selection unit according to Embodiment 1 of the present invention;

DETAILED DESCRIPTION OF THE EMBODIMENTS

Embodiment 1

Figure 1:
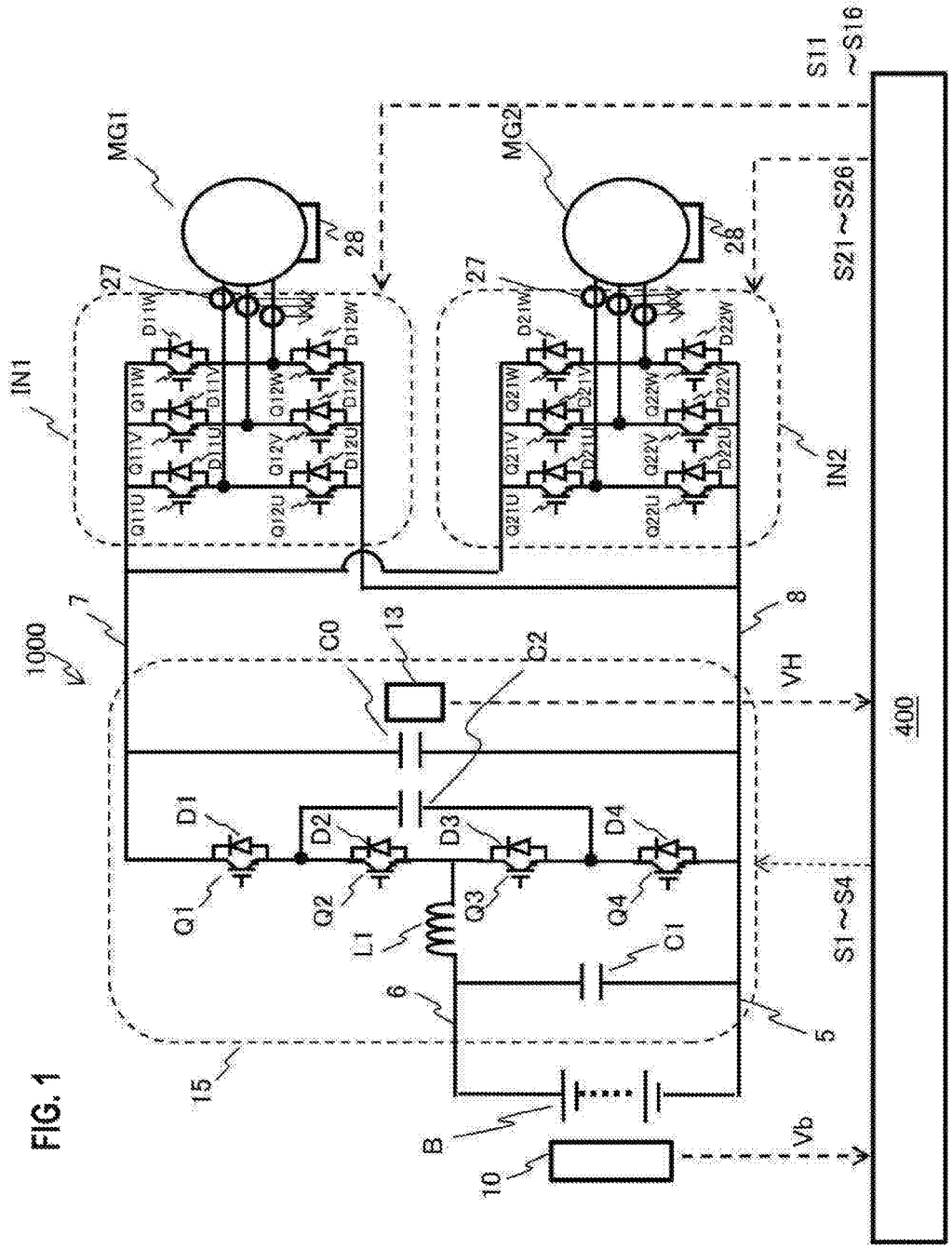
FIG. 1 is a schematic configuration diagram of a rotary electric machine drive apparatus and a controller according to Embodiment 1 of the present invention.
Figure 2:
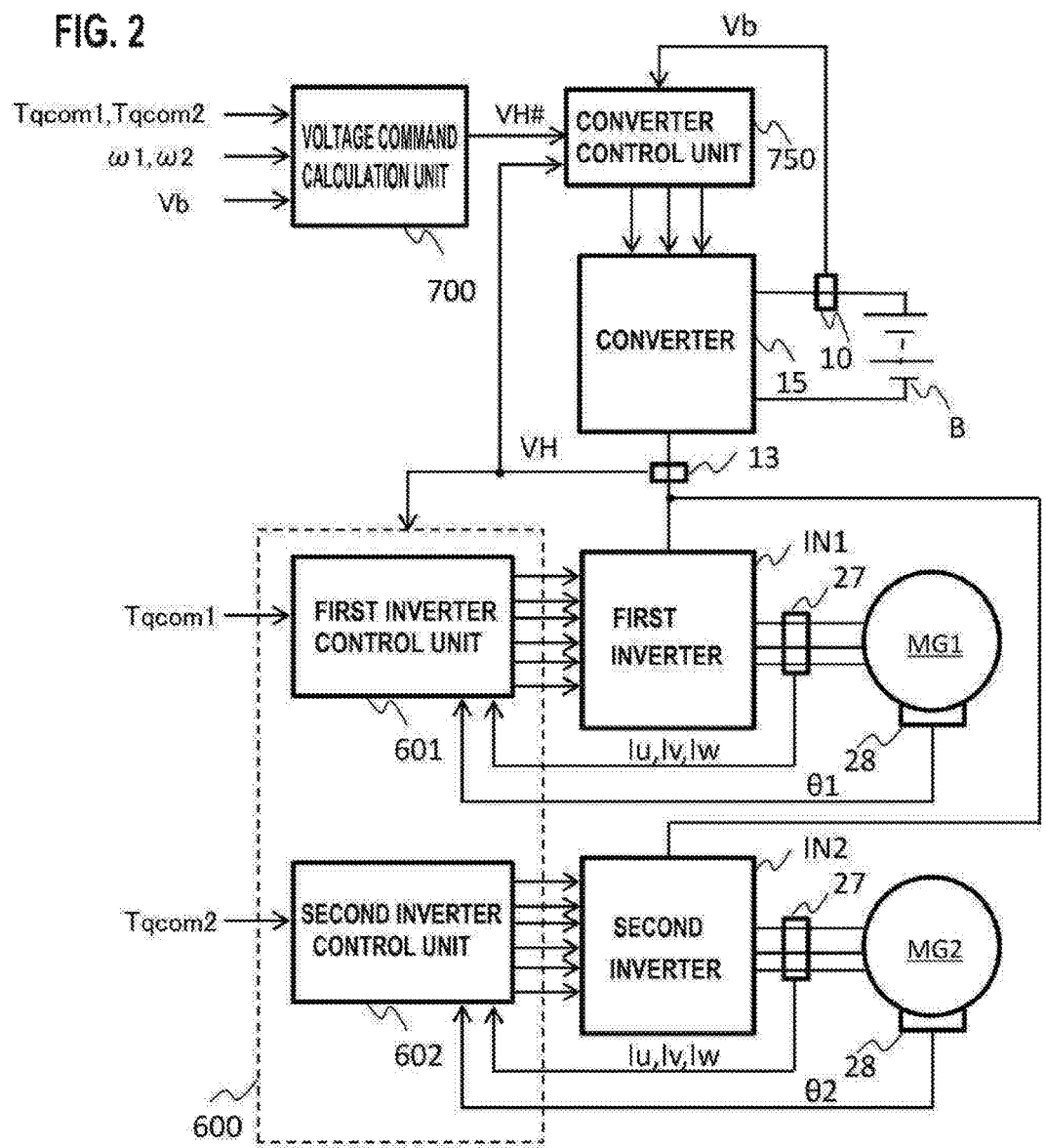
FIG. 2 is a schematic block diagram of a controller according to Embodiment 1 of the present invention.

A controller 400 for a rotary electric machine drive apparatus 1000 (hereinafter, referred to simply as the controller 400) according to Embodiment 1 will be explained with reference to the drawings. FIG. 1 is a schematic configuration diagram of the rotary electric machine drive apparatus 1000 and the controller 400 according to Embodiment 1 of the present invention.

The rotary electric machine drive apparatus 1000 is provided with a converter 15 which can raise a power source voltage Vb of a direct current power source B to output to a system voltage lines 7, 8; and an inverter IN which is provided between the converter 15 and a rotary electric machine MG and performs power conversion between direct current (DC) power of the system voltage lines 7, 8 and an alternating current (AC) power which drives the rotary electric machine MG. In the present embodiment, the rotary electric machine MG is used as a driving force source of wheels, and the rotary electric machine drive apparatus 1000 and the controller 400 are mounted in a vehicle (in this example, a hybrid vehicle). A plurality of sets (in this example, 2 sets) of the rotary electric machine MG and the inverter IN are provided.

Each of the first and the second rotary electric machine MG1, MG2 is provided with a stator fixed to a nonrotation member, and a rotor which is disposed in radial-direction inner side of the stator and supported rotatably. In the present embodiment, the rotary electric machine MG is a rotary electric machine of the permanent magnet synchronous type, the stator is provided with three-phase windings, and the rotor is provided with permanent magnets. Each of the first and the second rotary electric machine MG1, MG2 has a function of an electric motor and an electric generator.

In the present embodiment, the first rotary electric machine MG1 operates as the electric generator driven by an internal combustion engine (not shown), and operates as the electric motor which starts the internal combustion engine. The second rotary electric machine MG2 is connected with the wheels via an output axis and reduction gears, which are not shown, operates as the electric motor which drives the wheels, and operates as the electric generator which performs regenerative power generation by a driving force of the wheels.

Next, the equipment configuration for driving the first and the second rotary electric machine MG1, MG2 is explained. A secondary battery, such as nickel hydrogen or lithium ion, is used for the direct current power source B. An electrical double layer capacitor and the like may be used for the direct current power source B. A positive electrode terminal of the direct current power source B is connected to a power source side positive electric line 6 of the converter 15, and a negative electrode terminal of the direct current power source B is connected to a power source side negative electric line 5 of the converter 15. A power source voltage sensor 10 for detecting a power source voltage Vb of the direct current power source B is provided. An output signal of the power source voltage sensor 10 is inputted to the controller 400.

A converter 15 is connected between the direct current power source B and the system voltage lines 7, 8, and is a DC-DC converter which converts direct current power. In the present embodiment, the converter 15 is a voltage boosting and dropping converter having a function of a voltage boosting chopper which boosts a power source voltage Vb of the direct current power source B and outputs to the system voltage lines 7, 8, and a function of a voltage dropping chopper which drops a system voltage VH which is a DC voltage of the system voltage lines 7, 8 and outputs to the direct current power source B. The converter 15 is provided with a reactor, a switching device, and a free wheel diode at least.

The converter 15 is provided with a smoothing capacitor C1 connected between the power source side positive electric line 6 and the power source side negative electric line 5. A relay (not shown), which is turned on at the time of vehicle operation and turned off at the time of a vehicle operation stop, is provided between the positive electrode terminal of the direct current power source B and the power source side positive electric lines 6, and between the negative electrode terminal of the direct current power source B and the power source side negative electric lines 5.

In the present embodiment, the converter 15 is provided with the one reactor L1 for common use of the voltage boosting chopper and the voltage dropping chopper, the two switching devices Q3, Q4 for the voltage boosting chopper, the two free wheel diodes D1, D2 for the voltage boosting chopper, the two switching devices Q1, Q2 for the voltage dropping chopper, the two free wheel diodes D3, D4 for the voltage dropping chopper, and the one smoothing capacitor C0 for common use of the voltage boosting chopper and the voltage dropping chopper. The four switching devices Q1, Q2, Q3, Q4 are connected in series from the positive electrode side in order of Q1, Q2, Q3, and Q4 between the positive electrode side system voltage line 7 and the negative electrode side system voltage line 8. Each of the four free wheel diodes D1, D2, D3, D4 is connected in inverse parallel to each of the four switching devices Q1, Q2, Q3, Q4. Each of the four switching devices Q1, Q2, Q3, Q4 is controlled on/off by each of converter control signals S1, S2, S3, S4 outputted from the controller 400, respectively.

The reactor L1 is connected between a connection node of the switching device Q2 and the switching device Q3, and the power source side positive electric line 6. The capacitor C2 is connected between the connection node of the switching device Q1 and the switching device Q2, and the connection node of the switching device Q3 and the switching device Q4. The smoothing capacitor C0 is connected between the positive electrode side system voltage line 7 and the negative electrode side system voltage line 8. Between the positive electrode side system voltage line 7 and the negative electrode side system voltage line 8, a system voltage sensor 13 for detecting the system voltage VH of the system voltage lines 7, 8 is provided. An output signal of the system voltage sensor 13 is inputted to the controller 400.

The DC-voltage side of the first inverter IN1 and the second inverter IN2 are connected to the converter 15 via the common system voltage lines 7 and 8.

The first inverter IN1 is provided with three sets of a series circuit (leg) where a positive electrode side switching device Q11 (upper arm) connected to the positive electrode side system voltage line 7 and a negative electrode side switching device Q12 (lower arm) connected to the negative electrode side system voltage line 8 were connected in series, corresponding to each phase of the three phase windings. Thus, the first inverter IN1 is provided with a total of six switching devices of the three positive electrode side switching devices Q11U, Q11V, Q11W, and the three negative electrode side switching devices Q12U, Q12V, Q12W. Each of free wheel diodes D11U, D11V, D11W, D12U, D12V, D12W is connected in inverse parallel to each of the switching device Q11U, Q11V, Q11W, Q12U, Q12V, Q12W, respectively. Then, a connection node of the positive electrode side switching device Q11 and the negative electrode side switching device Q12 of each phase is connected to the winding of the corresponding phase in the first rotary electric machine MG1. A current sensor 27 for detecting a current which flows into the winding of each phase is provided on a wire of each phase which connects the connection node of switching devices and the winding. An output signal of the current sensor 27 is inputted to the controller 400. Each of the switching devices Q11U, Q11V, Q11W, Q12U, Q12V, Q12W is controlled on/off by each of first inverter control signals S11, S12, S13, S14, S15, S16 outputted from the controller 400, respectively.

In the similar manner, the second inverter IN2 is provided with three sets of a series circuit (leg) where a positive electrode side switching device Q21 (upper arm) connected to the positive electrode side system voltage line 7 and a negative electrode side switching device Q22 (lower arm) connected to the negative electrode side system voltage line 8 were connected in series, corresponding to each phase of the three phase windings. Thus, the second inverter IN2 is provided with a total of six switching devices of the three positive electrode side switching devices Q21U, Q21V, Q21W, and the three negative electrode side switching devices Q22U, Q22V, Q22W. Each of the free wheel diode D21U, D21V, D21W, D22U, D22V, D22W is connected in inverse parallel to each of the switching device Q21U, Q21V, Q21W, Q22U, Q22V, Q22W, respectively. Then, a connection node of the positive electrode side switching device Q21 and the negative electrode side switching device Q22 of each phase is connected to the winding of the corresponding phase in the second rotary electric machine MG2. A current sensor 27 for detecting a current which flows into the winding of each phase is provided on a wire of each phase which connects the connection node of a switching devices and the winding. An output signal of the current sensor 27 is inputted to the controller 400. Each of the switching device Q21U, Q21V, Q21W, Q22U, Q22V, Q22W is controlled on/off by each of second inverter control signals S21, S22, S23, S24, S25, S26 outputted from the controller 400, respectively.

By the switching control of the controller 400, the inverter IN1, IN2 can convert DC voltage of the system voltage lines 7, 8 into three-phase AC voltage, output to the rotary electric machine MG1, MG2, and can operate the rotary electric machine MG1, MG2 as the electric motor, respectively. By the switching control of the controller 400, the inverter IN1, IN2 can convert three-phase AC voltage, which the rotary electric machine MG1, MG2 generated, into DC voltage, and output to the system voltage lines 7, 8, respectively.

As the switching devices of the converter 15 and the inverter IN1, IN2, IGBTs (Insulated Gate Bipolar Transistor), MOS (Metal Oxide Semiconductor) transistors for power, bipolar transistors for power, SiC, GaN, or the like are used.

The rotary electric machine MG1, MG2 is provided with a rotational angle sensor 28 (in this example, a resolver) for detecting a rotational angle θ of the rotor, respectively. An output signal of the each rotational angle sensor 28 is inputted to the controller 400. The controller 400 detects each rotational angle θ1, θ2 of the rotary electric machine MG1, MG2 based on the output signal of the each rotational angle sensor 28, and calculates each rotational speed ω1, ω2 (in this example, rotational angle speed) of the rotary electric machine MG1, MG2 based on the each rotational angle θ1, θ2, respectively.

Figure 20:
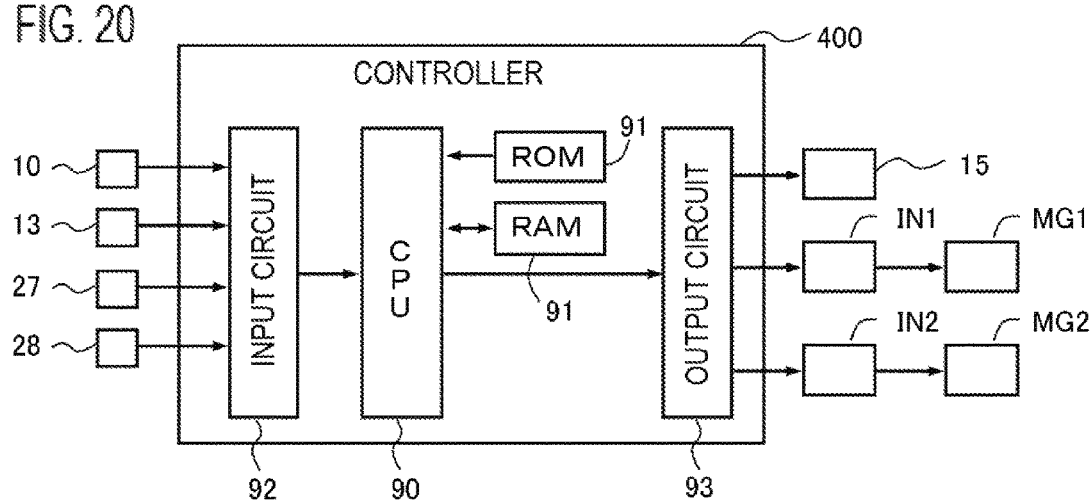
FIG. 20 is a hardware configuration diagram of the controller according to Embodiment 1 of the present invention.

The controller 400 is provided with functional parts of a converter control unit 750, a voltage command calculation unit 700, an inverter control unit 600, and the like, mentioned below. Each function of the controller 400 is realized by processing circuits provided in the controller 400. In the present embodiment, as shown in FIG. 20, the controller 400 is provided, as the processing circuits, with a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like. As the storage apparatuses 91, there are provided a RAM (Random Access Memory) that can read data and write data from the computing processing unit 90, a ROM (Read Only Memory) that can read data from the computing processing unit 90, and the like. The input circuit 92 is connected with various kinds of sensors and switches such as the voltage sensor 10, 13 and is provided with an A/D converter and the like for inputting output signals from the sensors and the switches to the computing processing unit 90. The output circuit 93 is connected with electric loads such as a gate drive circuit which drive on/off of the switching devices, and is provided with a driving circuit and the like for outputting a control signal from the computing processing unit 90. In the present embodiment, the power source voltage sensor 10, the system voltage sensor 13, the current sensor 27, and the rotational angle sensor 28 degree are connected to the input circuit 92. The switching devices (the gate drive circuit) of the converter 15, the switching devices (the gate drive circuit) of the inverter IN1, IN2 and the like are connected to the output circuit 93.

Then, the computing processing unit 90 runs software items (programs) stored in the storage apparatus 91 such as a ROM and collaborates with other hardware devices in the controller 400, such as the storage apparatus 91, the input circuit 92, and the output circuit 93, so that the each function of the control units 750, 700, 600 provided in the controller 400 are realized. Setting data items such as map data be utilized in the control units 750, 600, 700 are stored, as part of software items (programs), in the storage apparatus 91 such as a ROM. Each function of the controller 400 will be described in detail below.

<Inverter Control Section 600>

First, the inverter control unit 600 controls an operation of the rotary electric machine MG by controlling on/off of the switching devices of the inverter IN. The inverter control unit 600 controls on/off of the switching devices of the inverter IN so that the rotary electric machine MG outputs torque of a torque command value Tqcom. The torque command value Tqcom is transmitted from an external controller of the controller 400, or other control units inside the controller 400. In the present embodiment, the inverter control unit 600 is configured to perform a current feedback control using a vector control method. In the present embodiment, the inverter control unit 600 is provided with the first inverter control unit 601 which performs control of the first inverter IN1 and the first rotary electric machine MG1, and the second inverter control unit 602 which performs control of the second inverter IN2 and the second rotary electric machine MG2.

Each of the first and the second torque command value Tqcom1, Tqcom2 is set to positive value or negative value according to driving condition. Especially at the time of regenerative braking of the hybrid vehicle, the second torque command value Tqcom2 is set to negative value (Tqcom2<0). In this case, by the switching operation responded to the second inverter control signal S21 to S26, the second inverter IN2 converts the AC voltage, which the second rotary electric machine MG2 generated, into DC voltage, and supplies DC voltage (the system voltage VH) to the converter 15.

Since the first inverter control unit 601 and the second inverter control unit 602 are similar configurations, in the following description, the first inverter control unit 601 is explained as a representative.

Figure 3:
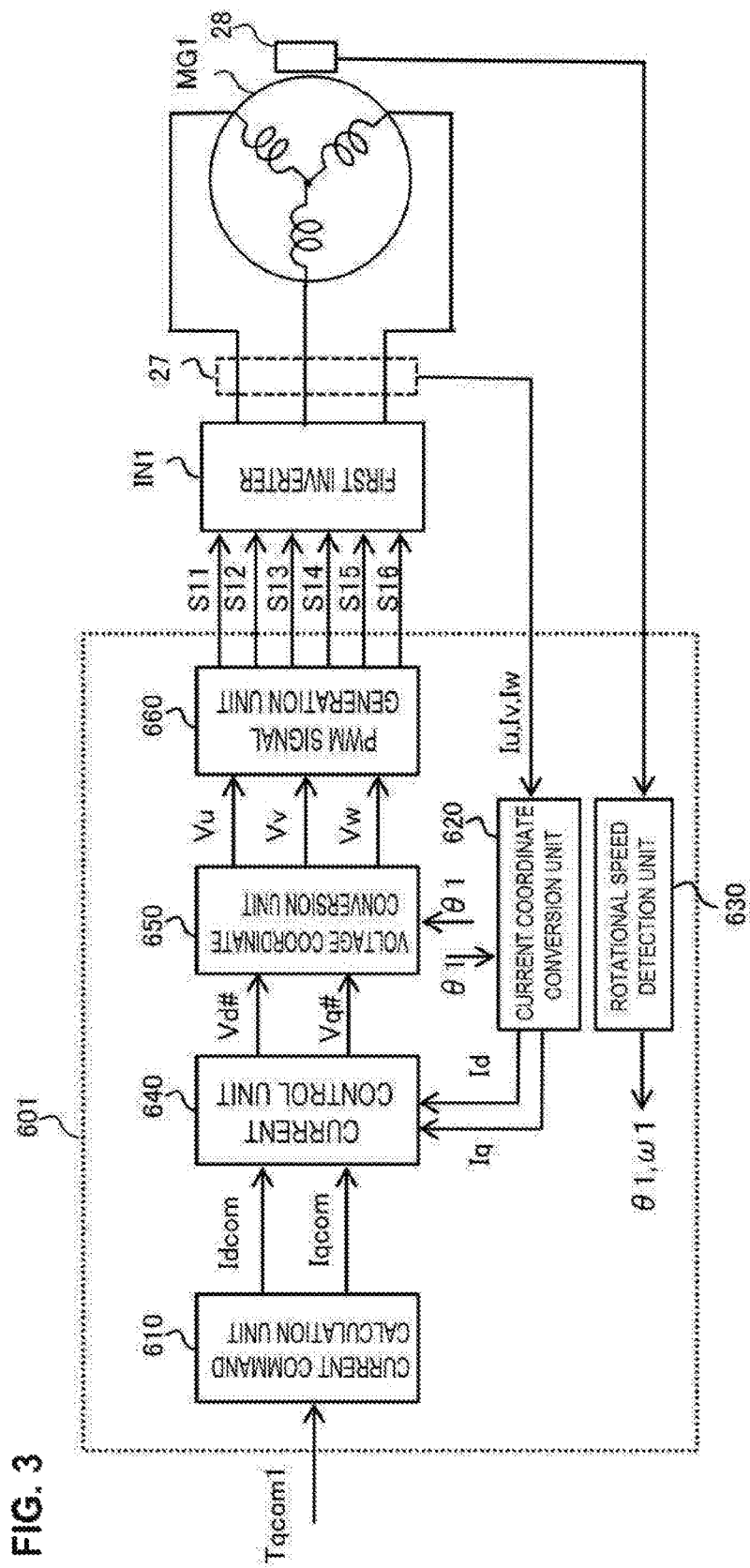
FIG. 3 is a block diagram of an inverter control unit according to Embodiment 1 of the present invention.

As shown in FIG. 3, the first inverter control unit 601 is provided with a current command calculation unit 610, a current control unit 640, a voltage coordinate conversion unit 650, a PWM signal generation unit 660, a current coordinate conversion unit 620, and a rotational speed detection unit 630. The rotational speed detection unit 630 detects a rotational angle $\theta1$ (a magnetic pole position) and a rotational angle speed $\omega1$ of the rotor of the first rotary electric machine MG1 based on the output signal of the rotational angle sensor 28 of the first rotary electric machine MG1.

The current command calculation unit 610 calculates a d-axis current command value Idcom and a q-axis current command value Iqcom which expressed command values of the current which flows into the three phase windings of the first rotary electric machine MG1 with the dq-axis rotating coordinate system of the first rotary electric machine MG1. The dq-axis rotating coordinate system consists of a d-axis defined in the direction of the N pole (magnetic pole position) of the permanent magnet provided in the rotor of the first rotary electric machine MG1 and a q-axis defined in the direction advanced to d-axis by 90 degrees (pi/2) in an electrical angle, and which is the two-axis rotating coordinate system which rotates synchronizing with rotation of the rotor in the electrical angle.

The current command calculation unit 610 calculates the d-axis current command value Idcom and the q-axis current command value Iqcom which makes the first rotary electric machine MG1 output a torque of the first torque command value Tqcom1. The current command calculation unit 610 calculates the dq-axis current command values Idcom, Iqcom in accordance with the current vector control method of a maximum torque/current control, a field weakening control and the like. In the maximum torque/current control, the dq-axis current command values Idcom, Iqcom which maximize the generated torque for the same current are calculated. In the field weakening control, the d-axis current command value Idcom is made to increase in the negative direction rather than the dq-axis current command values Idcom, Iqcom calculated in the maximum torque/current control. In the field weakening control, the dq-axis current command values Idcom, Iqcom are moved on a constant induced voltage ellipse (a voltage-limiting ellipse) according to the first torque command value Tqcom1. In the field weakening control, a torque control is performed so that the amplitude of a fundamental wave component is fixed almost.

The current command calculation unit 610 calculates the dq-axis current command values Idcom, Iqcom corresponding to the first torque command value Tqcom1, by use of a map data in which the relationship between the first torque command value Tqcom1 and the dq-axis current command values Idcom, Iqcom is preliminarily set for each control method.

The current command calculation unit 610 calculates the dq-axis current command values by the maximum torque/current control under the operating condition which can perform the maximum torque/current control; and calculates the dq-axis current command values by the field weakening control under the operating condition which cannot perform the calculation of the dq-axis current command values by the maximum torque/current control owing to limitation of the voltage-limiting ellipse.

The current coordinate conversion unit 620 converts three-phase currents Iu, Iv, Iw which flow into the winding of each phase and detected based on the output signal of the current sensor 27 of the first rotary electric machine MG1, into a d-axis current Id and a q-axis current Iq represented in the dq-axis rotating coordinate system by performing a three-phase/two-phase conversion and a rotating coordinate conversion based on the magnetic pole position θ1. The current control unit 640 performs a current feedback control which changes, by PI control and the like, a d-axis voltage command value Vd# and a q-axis voltage command value Vq# which represent a command signal of the voltage applied to the first rotary electric machine MG1 in the dq-axis rotating coordinate system, so that the dq-axis currents Id, Iq approach the dq-axis current command values Idcom, Iqcom. Then, the voltage coordinate conversion unit 650 converts the dq-axis voltage command values Vd#, Vq# into three-phase AC voltage command values Vu, Vv, Vw which are AC voltage command values to each phase of the three phase windings by performing a fixed coordinate conversion and a two-phase/three-phase conversion based on the magnetic pole position θ1. The system voltage VH is also reflected in the voltage coordinate conversions.

The PWM signal generation unit 660 compares each of the three-phase AC voltage command values Vu, Vv, Vw with a carrier wave (a triangular wave) which has a amplitude of the system voltage VH and oscillates with a carrier frequency; and turns on a rectangular pulse wave in the case where the AC voltage command value exceeds the carrier wave, and turns off the rectangular pulse wave in the case where the AC voltage command value bellows the carrier wave. The PWM signal generation unit 660 generates first inverter control signals S11 to S16 based on each phase of the three-phase rectangular pulse waves, and outputs them to the first inverter IN1.

<Converter Control Unit 750>

The converter control unit 750 controls the converter 15 so that the system voltage VH which is the DC voltage of the system voltage lines 7, 8 approaches a voltage command value VH#, in the case where the voltage command value VH# is larger than a power source voltage Vb. In the present embodiment, the converter control unit 750 detects the power source voltage Vb based on an output signal of the power source voltage sensor 10, and detects the system voltage VH based on an output signal of the system voltage sensor 13. The converter control unit 750 changes the duty ratio of the converter control signals S1 to S4 according to a PWM control method based on the system voltage VH and the voltage command value VH#.

In the case of performing a voltage boosting operation to the converter 15, for example the converter control unit 750 sets alternately the ON period of the switching devices Q1, Q2 and the ON period of the switching devices Q3, Q4, and changes the ratio of the two ON periods and changes a voltage boosting ratio. In the case of performing a voltage dropping operation to the converter 15, for example the converter control unit 750 sets alternately the ON period of the switching devices Q1, Q2, and the OFF period of the switching devices Q1, Q2, Q3, Q4, and changes the ratio of the ON period and the OFF period and changes a voltage dropping ratio. In the case where the voltage command value VH# is smaller than or equal to the power source voltage Vb, the converter control unit 750 all turns OFF the switching devices Q1, Q2, Q3, Q4, and changes the direct current power source B and the system voltage lines 7, 8 into a direct connection state.

At the time of the voltage boosting operation, the converter 15 supplies the system voltage VH, which boosted the power source voltage Vb supplied from the direct current power source B, to the inverter IN1, IN2 in common. At the time of the voltage dropping operation, the converter 15 drops the system voltage VH supplied from the inverter IN1, IN2 via the smoothing capacitor C0, and supplies it to the direct current power source B.

<Voltage Command Calculation Unit 700>

The voltage command calculation unit 700 calculates the voltage command value VH# within a range which is larger than or equal to the power source voltage Vb and is smaller than or equal to the output upper limit voltage Vmax of the converter 15.

In the rotary electric machine MG, since a counter electromotive force of the rotary electric machine MG will increase and an induced voltage will become high if the rotational speed ω and torque increase, the required minimum voltage VHL which is the minimum required system voltage VH in the case of performing the maximum torque/current control of the rotary electric machine MG becomes high. In order to perform the maximum torque/current control, it is necessary to make the system voltage VH higher than the required minimum voltage VHL. On the other hand, there is a limit in the voltage boosting of the converter 15, and there is an upper limit value (the output upper limit voltage Vmax) in the output voltage (system voltage VH) of the converter 15.

Figure 4:
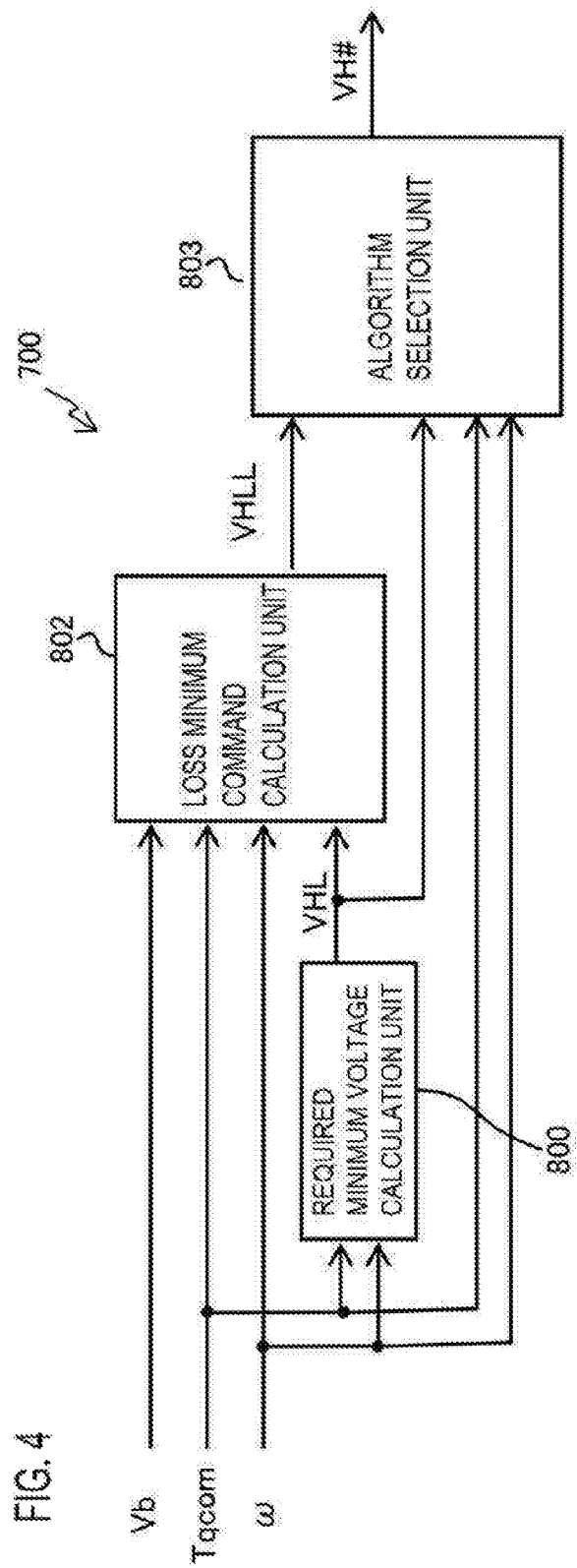
FIG. 4 is a block diagram of a voltage command calculation unit according to Embodiment 1 of the present invention.
Figure 7:
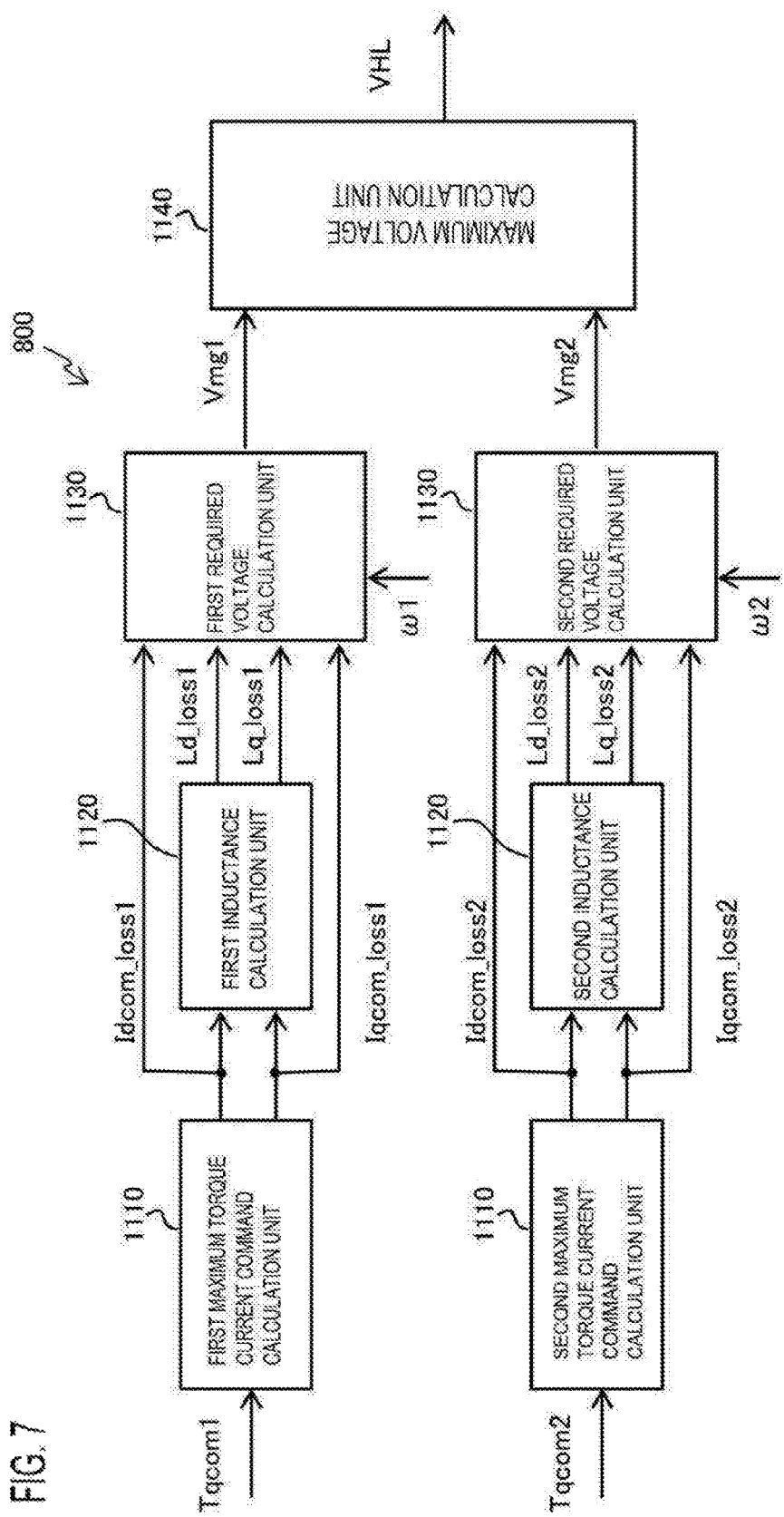
FIG. 7 is a block diagram of a required minimum voltage calculation unit according to Embodiment 1 of the present invention.

As shown in FIG. 4 and FIG. 7, the voltage command calculation unit 700 is provided with a required minimum voltage calculation unit 800 that calculates the required minimum voltage VHL which is the minimum system voltage VH required in the case of performing the maximum torque/current control of the rotary electric machine MG under conditions of the present torque command value Tqcom and the present rotational speed a of the rotary electric machine MG.

In the case where the required minimum voltage VHL is smaller than or equal to the output upper limit voltage Vmax, the voltage command calculation unit 700 sets the voltage command value VH# within a candidate voltage range which is larger than or equal to the required minimum voltage VHL and is smaller than or equal to the output upper limit voltage Vmax; and the inverter control unit 600 performs the maximum torque/current control. On the other hand, in the case where the required minimum voltage VHL is larger than the output upper limit voltage Vmax, the voltage command calculation unit 700 sets the output upper limit voltage Vmax as the voltage command value VH#, and performs the field weakening control.

Figure 5:
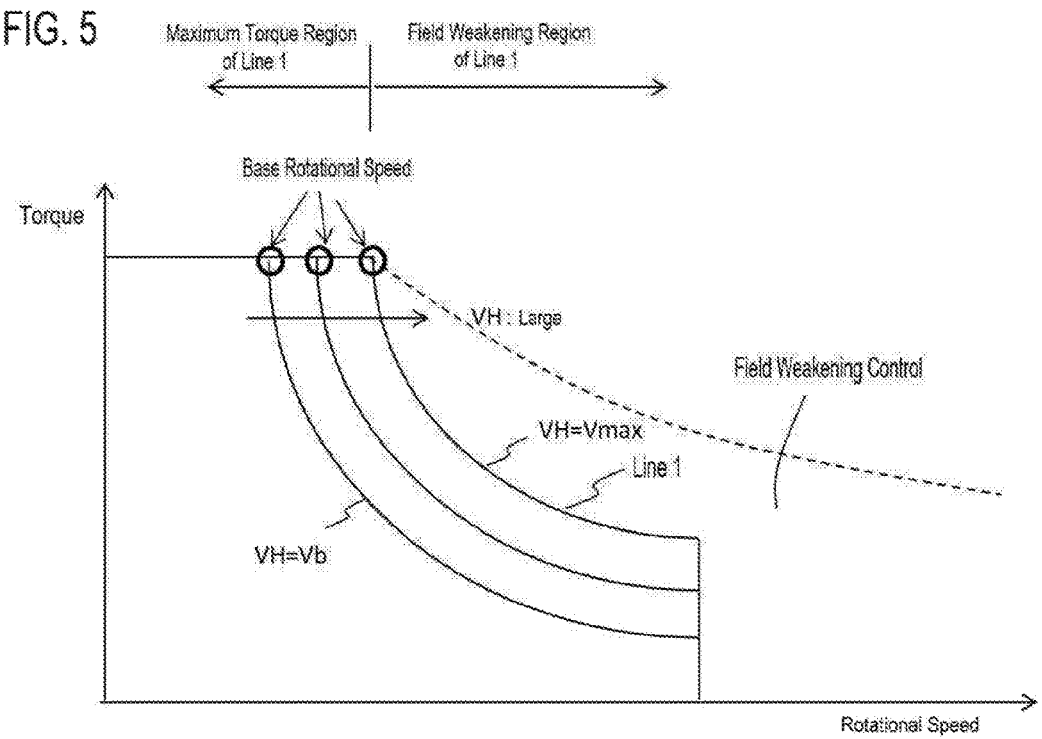
FIG. 5 is a torque-rotational speed characteristic figure of the electric rotating machine according to Embodiment 1 of the present invention.

FIG. 5 shows a torque-rotational speed characteristic for explaining a maximum torque region which performs the maximum torque/current control. A vertical axis is the torque of the rotary electric machine MG, a horizontal axis is the rotational speed ω of the rotary electric machine MG, and the solid line in the figure shows a maximum torque line at each rotational speed ω in the case of performing the maximum torque/current control. In the case where the rotational speed ω is smaller than or equal to a base rotational speed, the maximum output torque of the rotary electric machine MG is determined by restricting the current of the rotary electric machine MG to a rated current, and becomes a constant value to a change of the rotational speed ω. In the case where the rotational speed ω is larger than the base rotational speed, the maximum output torque of the rotary electric machine MG is determined by restricting a line voltage of the rotary electric machine MG to the system voltage VH, and decreases as the rotational speed ω increases.

A plurality of solid line curves of FIG. 5 show a change of the maximum torque line of the maximum torque/current control when changing the system voltage VH. As shown in FIG. 5, as the system voltage VH is boosted from the power source voltage Vb to the output upper limit voltage Vmax, the maximum torque line and the base rotational speed can be shifted to the high rotational speed side, and the maximum torque region can be expanded. In the case where the system voltage VH is the output upper limit voltage Vmax, the base rotational speed becomes the highest and the maximum torque region becomes the widest. The system voltage VH is changed within a range from the required minimum voltage VHL to the output upper limit voltage Vmax so that maximum torque/current control is performed in the maximum torque region corresponding to this output upper limit voltage Vmax.

A region of high rotational speed side and high torque side rather than the maximum torque region corresponding to this output upper limit voltage Vmax is set as a field weakening region to which the field weakening control is performed. In this field weakening region, the system voltage VH is controlled to the output upper limit voltage Vmax.

The maximum torque region is a region where the required minimum voltage VHL for performing the maximum torque/current control becomes smaller than or equal to the system voltage VH (the output upper limit voltage Vmax); the field weakening region is a region where the required minimum voltage VHL becomes larger than the system voltage VH (output upper limit voltage Vmax).

Figure 6:
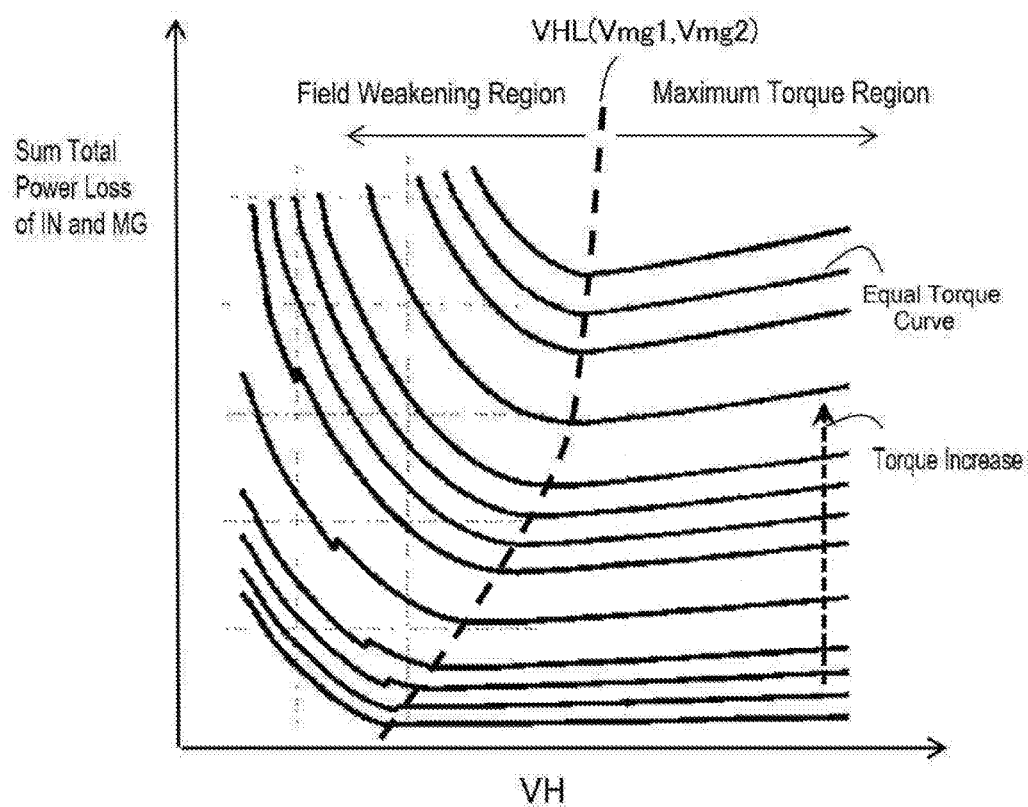
FIG. 6 is a power loss characteristic figure of the inverter and the rotary electric machine according to Embodiment 1 of the present invention.

FIG. 6 is a figure which plotted equal torque curves of each torque at a certain rotational speed, in the case where a vertical axis is a sum total power loss of the inverter IN and the rotary electric machine MG and a horizontal axis is the system voltage VH. Since a large motor current is generally necessary in order to generate a large torque, a loss becomes large accordingly. A broken line in FIG. 6 shows the line where the maximum torque region and the field weakening region switch; and the broken line is a line where the system voltage VH becomes the required minimum voltage VHL. FIG. 6 shows that the sum total power loss of the inverter IN and the rotary electric machine MG becomes small in near the line where the maximum torque region and the field weakening region switch.

In the field weakening region, the sum total power loss of the inverter IN and the rotary electric machine MG becomes large as the system voltage VH becomes small. Therefore, in the case where the first and the second rotary electric machine MG1, MG2 is provided and the required minimum voltage VHL of the first rotary electric machine MG1 (hereinafter, referred to a first required voltage Vmg1) differs from the required minimum voltage VHL of the second rotary electric machine MG2 (hereinafter, referred to a second required voltage Vmg2), by setting the voltage command value VH# so that the system voltage VH becomes close to either higher one out of Vmg1 and Vmg2, both the first and the second rotary electric machine MG1, MG2 can be operated in the maximum torque region side, and a loss can be reduced. In the present embodiment, as described later, the required minimum voltage calculation unit 800 sets a voltage of higher one out of the first required voltage Vmg1 and the second required voltage Vmg2 as the required minimum voltage VHL.

In the case of performing the maximum torque/current control, the voltage command value VH# can be set within a voltage range from the required minimum voltage VHL to the output upper limit voltage Vmax, and there is flexibility of setting. Then, the voltage command calculation unit 700 is provided with a loss minimum command calculation unit 802 which calculates a low loss voltage VHLL which is the system voltage VH which a sum total power loss of the converter 15 and the inverter IN becomes a minimum, within a candidate voltage range which is larger than or equal to the required minimum voltage VHL and is smaller than or equal to the output upper limit voltage Vmax of the converter 15, and sets the low loss voltage VHLL as the voltage command value VH#.

However, in order to calculate the system voltage VH which the sum total power loss becomes a minimum, there was a problem that data-processing load increases. For example, it is necessary to calculate the power loss using a power loss characteristic map data as shown in FIG. 6 about each of a plurality of candidate voltages, and to determine the voltage to which sum total power loss becomes a minimum from a plurality of candidate voltages.

Thus, the loss minimum command calculation unit 802 calculates a converter loss coefficient representing a power loss characteristic of the converter 15 which is a coefficient of a polynomial in which the system voltage VH is a variable, in the case where the required minimum voltage VHL is larger than or equal to the power source voltage Vb and is smaller than or equal to the output upper limit voltage Vmax of the converter 15; and calculates a inverter loss coefficient representing a power loss characteristic of the inverter IN which is a coefficient of the polynomial in which the system voltage VH is a variable. Then, the loss minimum command calculation unit 802 calculates a sum total of the converter loss coefficient and the inverter loss coefficient for each order of the polynomials; based on the calculated sum total loss coefficient for each order, calculates a low loss voltage VHLL within the candidate voltage range; and sets the low loss voltage VHLL as the voltage command value VH.

According to this constitution, since the low loss voltage VHLL is calculated based on the sum total loss coefficient which calculated the sum total of the converter loss coefficient and the inverter loss coefficient for each order of the polynomials, it is not necessary to perform a calculation which used map data about each of a plurality of candidate voltages, and can reduce data-processing load. Since each power loss characteristic is approximated by the polynomial, the amount of memories of storage apparatus can be significantly reduced rather than converting the power loss characteristic into map data directly.

The configuration of each units of the voltage command calculation unit 700 is explained in detail below.

<Required Minimum Voltage Calculation Unit 800>

First, the detailed configuration of the required minimum voltage calculation unit 800 is explained. The required minimum voltage calculation unit 800 calculates a first required voltage Vmg1 which is the minimum system voltage VH required in the case of performing the maximum torque/current control of the first rotary electric machine MG1 under conditions of the present torque command value Tqcom1 and the present rotational speed ω1 of the first rotary electric machine MG1. And, the required minimum voltage calculation unit 800 calculates an second required voltage Vmg2 which is the minimum system voltage VH required in the case of performing the maximum torque/current control of the second rotary electric machine MG2 under conditions of the present torque command value Tqcom2 and the present rotational speed ω2 of the second rotary electric machine MG2. Then, the required minimum voltage calculation unit 800 sets a maximum value out of the first required voltage Vmg1 and the second required voltage Vmg2 as the required minimum voltage VHL.

According to this constitution, the minimum system voltage VH in which both of the first and the second rotary electric machine MG1, MG2 can perform the maximum torque/current control can be set as the required minimum voltage VHL. Therefore, it can avoid performing of the field weakening control which the power loss increases, and can reduce the power loss of the first and the second inverters and rotary electric machines.

In the present embodiment, as shown in FIG. 7, the required minimum voltage calculation unit 800 is provided with a first and a second maximum torque current command calculation units 1110, a first and a second inductance calculation units 1120, a first and a second required voltage calculation units 1130, and a maximum voltage calculation unit 1140.

The first maximum torque current command calculation unit 1110 calculates first maximum torque dq-axis current command values Idcom_loss1, Iqcom_loss1 which make the first rotary electric machine MG1 output the first torque command value Tqcom1, by performing the maximum torque/current control. The first maximum torque current command calculation unit 1110 calculates the dq-axis current command values by the similar method as the current command calculation unit 610 of the first inverter control unit 601.

In the present embodiment, the first maximum torque current command calculation unit 1110 calculates the first maximum torque dq-axis current command values Idcom_loss1, Iqcom_loss1 on a fixed operating condition of a preliminarily set rotational speed (for example, ω1=0) smaller than or equal to the base rotational speed. According to this constitution, even if the present operating condition is the field weakening region, the current command values for the maximum torque/current control can be certainly calculated.

The first maximum torque current command calculation unit 1110 calculates the first maximum torque dq-axis current command values Idcom_loss1, Iqcom_loss1 corresponding to the first torque command value Tqcom1, by use of a map data in which the relationship between the first torque command value Tqcom1 and the first maximum torque dq-axis current command values Idcom_loss1, Iqcom_loss1 is preliminarily set. The map data is preliminarily set based on measured value or magnetic field analysis. The q-axis current command value and d-axis current command value corresponding to the each torque command value are set to the map data at the interval (unit) of predetermined torque command value.

The first inductance calculation unit 1120 calculates first dq-axis inductances Ld_loss1, Lq_loss1 of the first rotary electric machine MG1 corresponding to the first maximum torque dq-axis current command values Idcom_loss1, Iqcom_loss1. The first inductance calculation unit 1120 calculates the first dq-axis inductances Ld_loss1, Lq_loss1 corresponding to the first maximum torque dq-axis current command values Idcom_loss1, Iqcom_loss1, by use of a map data in which the relationship between the first maximum torque dq-axis current command values Idcom_loss1, Iqcom_loss1 and the first dq-axis inductance Ld_loss1, Lq_loss1 is preliminarily set.

The first required voltage calculation unit 1130 calculates the first required voltage Vmg1 using a next equation, based on the first maximum torque dq-axis current command values Idcom_loss1, Iqcom_loss1, the first dq-axis inductances Ld_loss1, Lq_loss1, and the rotational speed ω1 of the first rotary electric machine MG1.

$$Vmg1 = \frac{1}{\eta 1} \sqrt{\begin{array}{l}(R1 \cdot \text{Idcom\_loss1} - \omega 1 \cdot \text{Lq\_loss1} \cdot \text{Iqcom\_loss1})^2 + \\ (R1 \cdot \text{Idcom\_loss1} + \omega 1 \cdot \text{Ld\_loss1} \cdot \text{Idcom\_loss1} + \omega 1 \cdot \phi mag1)^2\end{array}} \quad (1)$$

Here, η1 is a voltage utilization factor and expresses the ratio which converts the system voltage VH into the line voltage of the first rotary electric machine MG1. Therefore, the equation (1) calculates the minimum line voltage of the first rotary electric machine MG1 required in the case of performing the maximum torque/current control of the first rotary electric machine MG1 by the calculation of a square root, and converts the line voltage into the system voltage using η1. R1 is a resistance of the winding of the stator of the first rotary electric machine MG1; and φmag1 is a magnetic flux of the permanent magnet of the rotor of the first rotary electric machine MG1.

By the similar method as the first maximum torque current command calculation unit 1110, the second maximum torque current command calculation unit 1110 calculates second maximum torque dq-axis current command values Idcom_loss2, Iqcom_loss2 which make the second rotary electric machines MG2 output the second torque command value Tqcom2, by performing the maximum torque/current control.

By the similar method as the first inductance calculation unit 1120, the second inductances calculation unit 1120 calculates second dq-axis inductances Ld_loss2, Lq_loss2 of the second rotary electric machines MG2 corresponding to the second maximum torque dq-axis current command values Idcom_loss2, Iqcom_loss2.

The second required voltage calculation unit 1130 calculates the second required voltage Vmg2 using a next equation, based on the second maximum torque dq-axis current command values Idcom_loss2, Iqcom_loss2, the second dq-axis inductances Ld_loss2, Lq_loss2, and the rotational speed ω2 of the second rotary electric machines MG2.

$$Vmg2 = \frac{1}{\eta 2} \sqrt{\begin{array}{l}(R2 \cdot \text{Idcom\_loss2} - \omega 2 \cdot \text{Lq\_loss2} \cdot \text{Iqcom\_loss2})^2 + \\ (R2 \cdot \text{Idcom\_loss2} + \omega 2 \cdot \text{Ld\_loss2} \cdot \text{Idcom\_loss2} + \omega 2 \cdot \phi mag2)^2\end{array}} \quad (2)$$

Here, η2 is a voltage utilization factor and expresses the ratio which converts the system voltage VH into the line voltage of the second rotary electric machines MG2. R2 is a resistance of the winding of the stator of the second rotary electric machines MG2; and φmag2 is a magnetic flux of the permanent magnet of the rotor of the second rotary electric machine MG2.

The maximum voltage calculation unit 1140 calculates a maximum value out of the first required voltage Vmg1, the second required voltage Vmg2, and the power source voltage Vb using a next equation, and sets the maximum value as the required minimum voltage VHL.

$$VHL=\text{MAX}(Vmg1, Vmg2, Vb) \quad (3)$$

Here, MAX (A, B, C) is a function which outputs the largest value among A, B, and C. VHL=MAX (Vmg1, Vmg2) may be used.

<Loss Minimum Command Calculation Unit 802>

As mentioned above, the loss minimum command calculation unit 802 calculates the converter loss coefficient representing the power loss characteristic of the converter 15 which is the coefficient of the polynomial in which the system voltage VH is a variable, in the case the required minimum voltage VHL is larger than or equal to the power source voltage Vb and is smaller than or equal to the output upper limit voltage Vmax of the converter 15; calculates the inverter loss coefficient representing the power loss characteristic of the inverter IN which is the coefficient of the polynomial in which the system voltage VH is a variable; and calculates the sum total of the converter loss coefficient and the inverter loss coefficient for each order of the polynomials. Then, based on the calculated sum total loss coefficient for each order, the loss minimum command calculation unit 802 calculates the low loss voltage VHLL which is the system voltage VH from which the sum total power loss of the converter 15 and the inverter IN becomes minimum, within the candidate voltage range which is larger than or equal to the required minimum voltage VHL and is smaller than or equal to the output upper limit voltage Vmax of the converter 15; and sets the low loss voltage VHLL as the voltage command value VH#.

Figure 8:
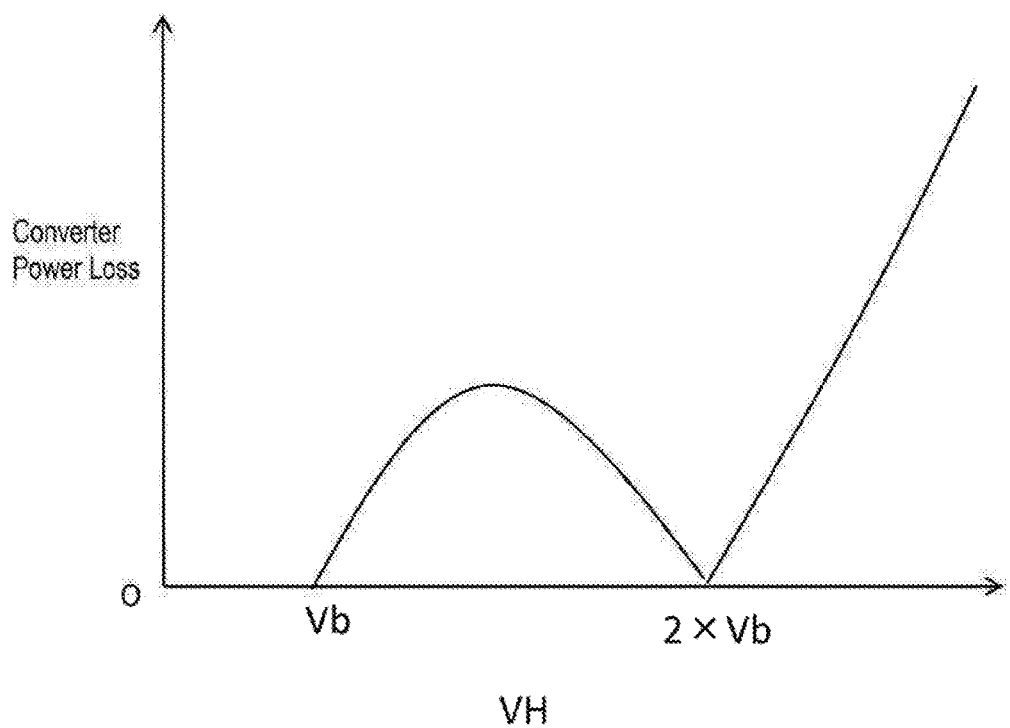
FIG. 8 is a power loss characteristic figure of the converter according to Embodiment 1 of the present invention.

First, the power loss characteristic of the converter 15 will be explained. FIG. 8 shows the power loss characteristic in the case where the output (output power) of the converter 15 is low (in this example, the output is zero). A horizontal axis is the system voltage VH and a vertical axis is the power loss of the converter 15. The power loss of the converter 15 becomes an upwardly projected parabolic characteristic in a range which the system voltage VH is from the power source voltage Vb to the double value 2×Vb of the power source voltage Vb. In a range which the system voltage VH becomes larger than or equal to the double value 2×Vb of the power source voltage, the power loss of the converter 15 becomes a monotone increase characteristic which the power loss of the converter 15 increases as the system voltage VH increases. Therefore, when the required minimum voltage VHL is within the range from Vb to 2×Vb, the sum total power loss of the rotary electric machine drive apparatus 1000 does not necessarily become a minimum only by setting the required minimum voltage VHL as the voltage command value VH#.

Therefore, the loss minimum command calculation unit 802 determines whether or not the required minimum voltage VHL is within the range from the power source voltage Vb to the double value 2×Vb of the power source voltage; and in the case of within the range, performs processing which sets the voltage command value VH# in consideration of the upwardly projected parabolic power loss characteristic of the converter 15.

Figure 9:
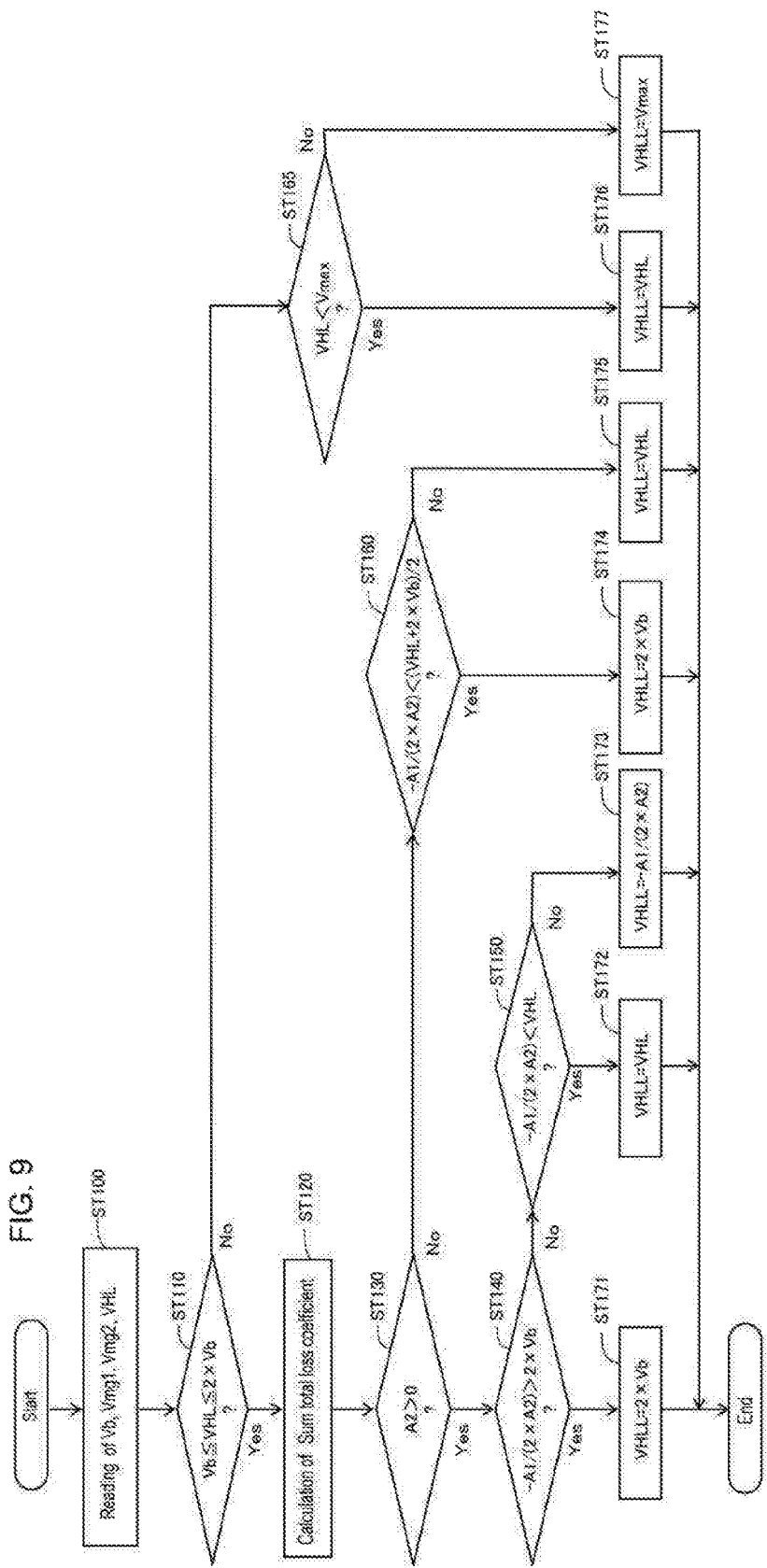
FIG. 9 is a flowchart representing a processing of a loss minimum command calculation unit according to Embodiment 1 of the present invention.

FIG. 9 is a flow chart showing a processing of the loss minimum command calculation unit 802. First, in the step ST100, the loss minimum command calculation unit 802 reads information of the power source voltage Vb, the first and the second required voltage Vmg1, Vmg2, and the required minimum voltage VHL. Then, in the step ST110, the loss minimum command calculation unit 802 determines whether or not the required minimum voltage VHL is within the range which is larger than or equal to the power source voltage Vb and is smaller than or equal to the double value 2×Vb of the power source voltage; in the case where it is determined that the required minimum voltage VHL is within the range, advances to the step ST120; in the case where it is determined that the required minimum voltage VHL is outside the range, advances to the step ST165.

In the step ST120, the loss minimum command calculation unit 802 calculates the converter loss coefficient representing the power loss characteristic of the converter 15 which is the coefficient of the polynomial in which the system voltage VH is a variable; calculates the inverter loss coefficient representing the power loss characteristic of the inverter IN which is the coefficient of the polynomial in which the system voltage VH is a variable; and calculates the sum total of the converter loss coefficient and the inverter loss coefficient for each order of the polynomials (the sum total loss coefficient).

In the present embodiment, the polynomial representing the power loss characteristic of the converter 15 is a polynomial whose order is smaller than or equal to the 2nd-order (in this example, the 2nd order).

$$Ploss\_dcdc(VH) = A0dcdc + A1dcdc \cdot VH + A2dcdc \cdot VH^2 \quad (4)$$

Here, Ploss_dcdc is the power loss of the converter 15, A0*dcdc* is a zero-order converter loss coefficient, A1*dcdc* is a 1st-order converter loss coefficient, and A2*dcdc* is a 2nd-order converter loss coefficient.

Figure 10:
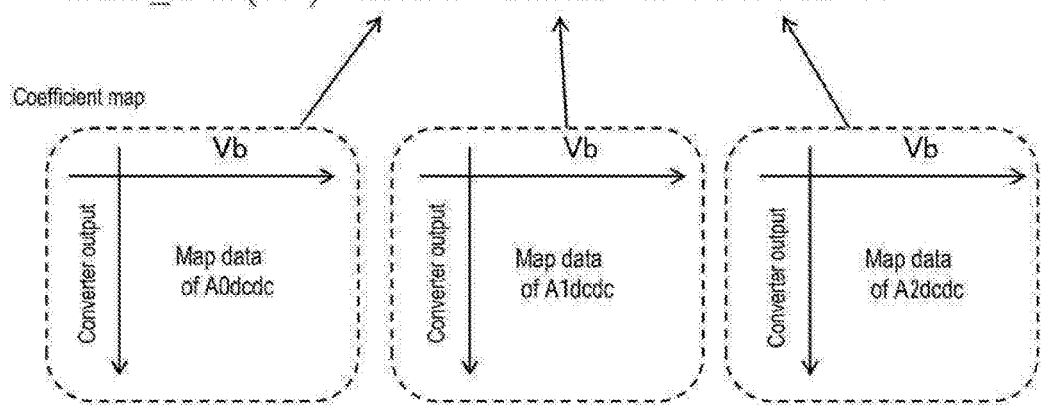
FIG. 10 is a figure for explaining a polynomial representing a power loss characteristic of the converter and a calculation of coefficient according to Embodiment 1 of the present invention.

As shown in FIG. 10, the loss minimum command calculation unit 802 calculates the converter loss coefficient corresponding to the present power source voltage Vb and the present output of the converter 15, about each order, by use of a relation characteristic in which a relationship among the power source voltage Vb, the output (output power) of the converter 15, and the converter loss coefficient is preliminarily set. In this example, the loss minimum command calculation unit 802 calculates the zero-order converter loss coefficient A0*dcdc* corresponding to the present power source voltage Vb and the present output of the converter 15, by use of a map data in which a relationship among the power source voltage Vb, the output of the converter 15, and the zero-order converter loss coefficient A0*dcdc* is preliminarily set. Similarly, the loss minimum command calculation unit 802 calculates the 1st-order converter loss coefficient A1*dcdc* corresponding to the present power source voltage Vb and the present output of the converter 15, by use of a map data in which a relationship among the power source voltage Vb, the output of the converter 15, and the 1st-order converter loss coefficient A1*dcdc* is preliminarily set. And also, the loss minimum command calculation unit 802 calculates the 2nd-order converter loss coefficient A2*dcdc* corresponding to the present power source voltage Vb and the present output of the converter 15, by use of a map data in which a relationship among the power source voltage Vb, the output of the converter 15, and the 2nd-order converter loss coefficient A2*dcdc* is preliminarily set.

Each of the converter loss coefficients is preliminarily set based on a power loss data of the converter 15 for a range of the system voltage VH between the power source voltage Vb and the double value 2×Vb of the power source voltage. Each of the converter loss coefficients is preliminarily set using the least square method, based on measured value and loss data calculated by a loss calculation of the converter.

In the present embodiment, the loss minimum command calculation unit 802 calculates the inverter loss coefficients about each of the first and the second inverter IN1, IN2. The loss minimum command calculation unit 802 calculates the inverter loss coefficient which is a coefficient of a polynomial in which the system voltage VH is a variable and which represents a power loss characteristic of the rotary electric machine MG in addition to the inverter IN. That is to say, the loss minimum command calculation unit 802 calculates the first inverter loss coefficient which is a coefficient of a polynomial in which the system voltage VH is a variable and which represents a sum total power loss characteristic of the first inverter IN1 and the first rotary electric machine MG1. The loss minimum command calculation unit 802 calculates the second inverter loss coefficient which is a coefficient of a polynomial in which the system voltage VH is a variable and which represents a sum total power loss characteristic of the second inverter IN2 and the second rotary electric machine MG2.

The polynomial representing the sum total power loss characteristic of the first inverter IN1 and the first rotary electric machine MG1 is a polynomial whose order is smaller than or equal to the 2nd-order (in this example, the 2nd-order) as shown in the next equation.

$$Ploss\_mg1(VH)=A0mg1+A1mg1 \cdot VH+A2mg1 \cdot VH^2 \qquad (5)$$

Here, Ploss_mg1 is the sum total power loss of the first inverter IN1 and the first rotary electric machine MG1, A0$mg1$ is a zero-order first inverter loss coefficient, A1$mg1$ is a 1st-order first inverter loss coefficient, and A2$gm1$ is a 2nd-order first inverter loss coefficient.

Figure 11:
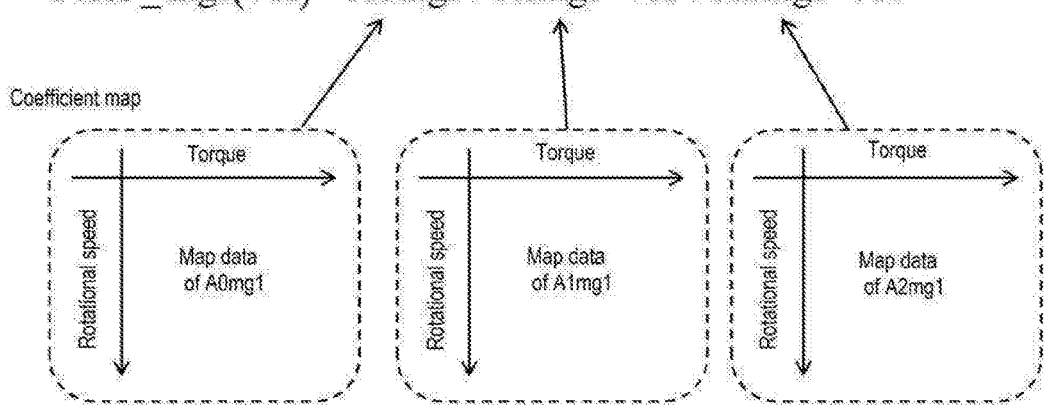
FIG. 11 is a figure for explaining a polynomial representing a power loss characteristic of the first inverter and a calculation of coefficient according to Embodiment 1 of the present invention.

As shown in FIG. 11, the loss minimum command calculation unit 802 calculates the first inverter loss coefficient corresponding to the present torque command value Tqcom1 and the present rotational speed ω1 of the first rotary electric machine MG1, about each order, by use of a relation characteristic in which a relationship among the output torque of the first rotary electric machine MG1, the rotational speed ω1 of the first rotary electric machine MG1, and the first inverter loss coefficient is preliminarily set. In this example, the loss minimum command calculation unit 802 calculates a zero-order first inverter loss coefficient A0$mg1$ corresponding to the present torque command value Tqcom1 and the present rotational speed ω1 of the first rotary electric machine MG1, by use of a map data in which a relationship among the output torque of the first rotary electric machine MG1, the rotational speed ω1 of the first rotary electric machine MG1, and the zero-order first inverter loss coefficient A0$mg1$ is preliminarily set. Similarly, the loss minimum command calculation unit 802 calculates a 1st-order first inverter loss coefficient A1$mg1$ corresponding to the present torque command value Tqcom1 and the present rotational speed ω1 of the first rotary electric machine MG1, by use of a map data in which a relationship among the output torque of the first rotary electric machine MG1, the rotational speed ω1 of the first rotary electric machine MG1, and the 1st-order first inverter loss coefficient A1$mg1$ is preliminarily set. The loss minimum command calculation unit 802 calculates a 2nd-order first inverter loss coefficient A2$mg1$ corresponding to the present torque command value Tqcom1 and the present rotational speed ω1 of the first rotary electric machine MG1, by use of a map data in which a relationship among the output torque of the first rotary electric machine MG1, the rotational speed ω1 of the first rotary electric machines MG1, and the 2nd-order first inverter loss coefficient A2$mg1$ is preliminarily set.

Each of the first inverter loss coefficients is preliminarily set based on a sum total power loss data of the first inverter IN1 and the first rotary electric machine MG1 for a range of the system voltage VH between the power source voltage Vb and the double value 2×Vb of the power source voltage. Each of the first inverter loss coefficients is preliminarily set using the least square method, based on measured value, magnetic field analysis, and loss data calculated by loss calculation of the inverter.

The polynomial representing the sum total power loss characteristic of the second inverter IN2 and the second rotary electric machine MG2 is a polynomial whose order is smaller than or equal to the 2nd-order (in this example, the 2nd-order) as shown in the next equation.

$$Ploss\_mg2(VH)=A0mg2+A1mg2 \cdot VH+A2mg2 \cdot VH^2 \qquad (6)$$

Here, Ploss_mg2 is the sum total power loss of the second inverter IN2 and the second rotary electric machine MG2, A0$mg2$ is a zero-order second inverter loss coefficient, A1$mg2$ is a 1st-order second inverter loss coefficient, and A2$gm2$ is a 2nd-order second inverter loss coefficient.

Figure 12:
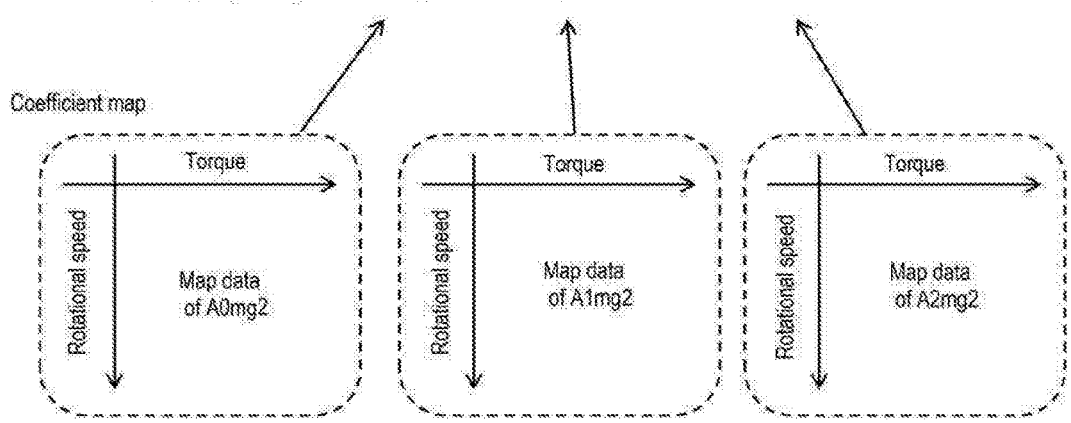
FIG. 12 is a figure for explaining a polynomial representing a power loss characteristic of the second inverter and a calculation of coefficient according to Embodiment 1 of the present invention.

As shown in FIG. 12, the loss minimum command calculation unit 802 calculates the second inverter loss coefficient corresponding to the present torque command value Tqcom2 and the present rotational speed ω2 of the second rotary electric machine MG2, about each order, by use of a relation characteristic in which a relationship among the output torque of the second rotary electric machine MG2, the rotational speed ω2 of the second rotary electric machine MG2, and the second inverter loss coefficient is preliminarily set. In this example, the loss minimum command calculation unit 802 calculates a zero-order second inverter loss coefficient A0$mg2$ corresponding to the present torque command value Tqcom2 and the present rotational speed ω2 of the second rotary electric machine MG2, by use of a map data in which a relationship among the output torque of the second rotary electric machine MG2, the rotational speed ω2 of the second rotary electric machine MG2, and the zero-order second inverter loss coefficient A0$mg2$ is preliminarily set. Similarly, the loss minimum command calculation unit 802 calculates a 1st-order second inverter loss coefficient A1$mg2$ corresponding to the present torque command value Tqcom2 and the present rotational speed ω2 of the second rotary electric machine MG2, by use of a map data in which a relationship among the output torque of the second rotary electric machine MG2, the rotational speed ω2 of the second rotary electric machine MG2, and the 1st-order second inverter loss coefficient A1$mg2$ is preliminarily set. The loss minimum command calculation unit 802 calculates a 2nd-order second inverter loss coefficient A2$mg2$ corresponding to the present torque command value Tqcom2 and the present rotational speed ω2 of the second rotary electric machine MG2, by use of a map data in which a relationship among the output torque of the second rotary electric machine MG2, the rotational speed ω2 of the second rotary electric machine MG2, and the 2nd-order second inverter loss coefficient A2$mg2$ is preliminarily set.

Each of the second inverter loss coefficients is preliminarily set based on a sum total power loss data of the second inverter IN2 and the second rotary electric machine MG2 for a range of the system voltage VH between the power source voltage Vb and the double value 2×Vb of the power source voltage. Each of the second inverter loss coefficients is preliminarily set using the least square method, based on measured value, magnetic field analysis, and loss data calculated by loss calculation of the inverter.

The loss minimum command calculation unit 802 calculates the sum total of the converter loss coefficients, the first inverter loss coefficients, and the second inverter loss coefficients for every order of the polynomial (the sum total loss coefficient), as shown in the next equation.

$$A0 = A0dcdc + A0mg1 + A0mg2$$

$$A1 = A1dcdc + A1mg1 + A1mg2$$

$$A2 = A2dcdc + A2mg1 + A2mg2 \quad (7)$$

Here, A0 is a zero-order sum total loss coefficient, A1 is a 1st-order sum total loss coefficient, and A2 is a 2nd-order sum total loss coefficient.

A sum total power loss Ploss which totaled the power loss Ploss_dcdc of the converter 15, the sum total power loss Ploss_mg1 of the first inverter IN1 and the first rotary electric machine MG1, and the sum total power loss Ploss_mg2 of the second inverter IN2 and the second rotary electric machine MG2 becomes a polynomial which used the sum total loss coefficients A0, A1, A2 as shown in the next equation.

$$Ploss(VH) = A0 + A1 \cdot VH + A2 \cdot VH^2 \quad (8)$$

Figure 13A:
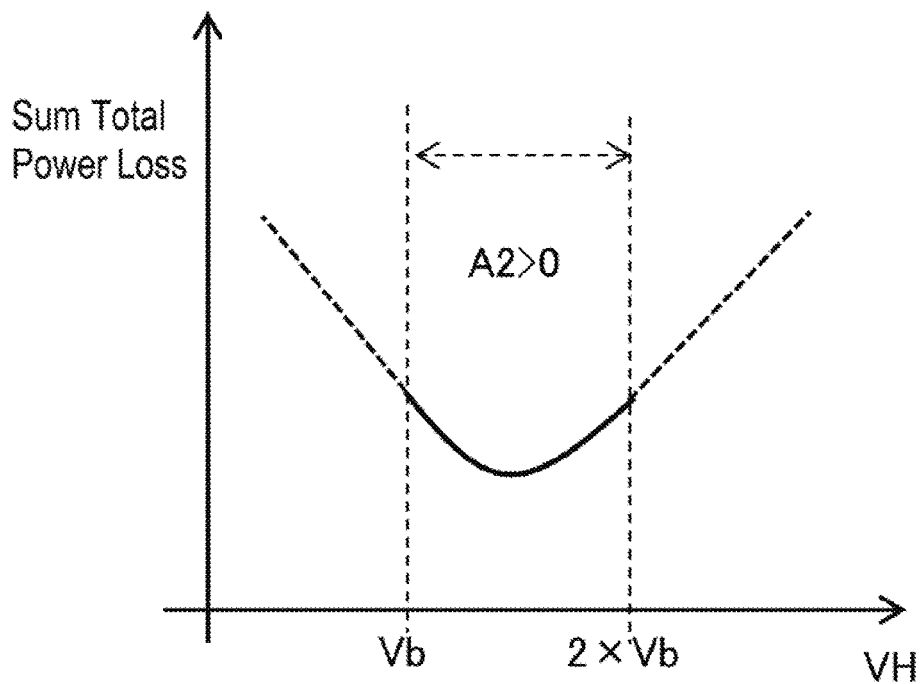

Next, in the step ST130, the loss minimum command calculation unit 802 determines whether or not the 2nd-order sum total loss coefficient A2 is a positive value; in the case where A2 is a positive value, advances to the step ST140; in the case where A2 is 0 or a negative value, advances to the step ST160. As shown in FIG. 13A and FIG. 13B, in the case where the 2nd-order sum total loss coefficient A2 is a positive value, the sum total power loss becomes a downwardly projected, and in the case where the 2nd-order sum total loss coefficient A2 is a negative value, the sum total power loss becomes an upwardly projected.

In the step ST140, the loss minimum command calculation unit 802 calculates an extremum voltage Vpl which is the system voltage VH from which the sum total power loss becomes a minimum, based on the 2nd-order and the 1st-order sum total loss coefficients A2, A1. The loss minimum command calculation unit 802 calculates the extremum voltage Vpl using the next equation which is a theoretical formula which calculates the extremum of a quadratic equation. Therefore, by easy calculation using the 2nd-order and the 1st-order sum total loss coefficients A2, A1, the extremum voltage Vpl can be calculated and processing load can be reduced significantly.

$$Vpl = -A1/(2 \times A2) \quad (9)$$

Then, the loss minimum command calculation unit 802 determines whether or not the extremum voltage Vpl is larger than the double value 2×Vb of the power source voltage; in the case where the extremum voltage Vpl is larger, advances to the step ST171; in the case where the extremum voltage Vpl is not larger, advances to the step ST150.

Figure 14:
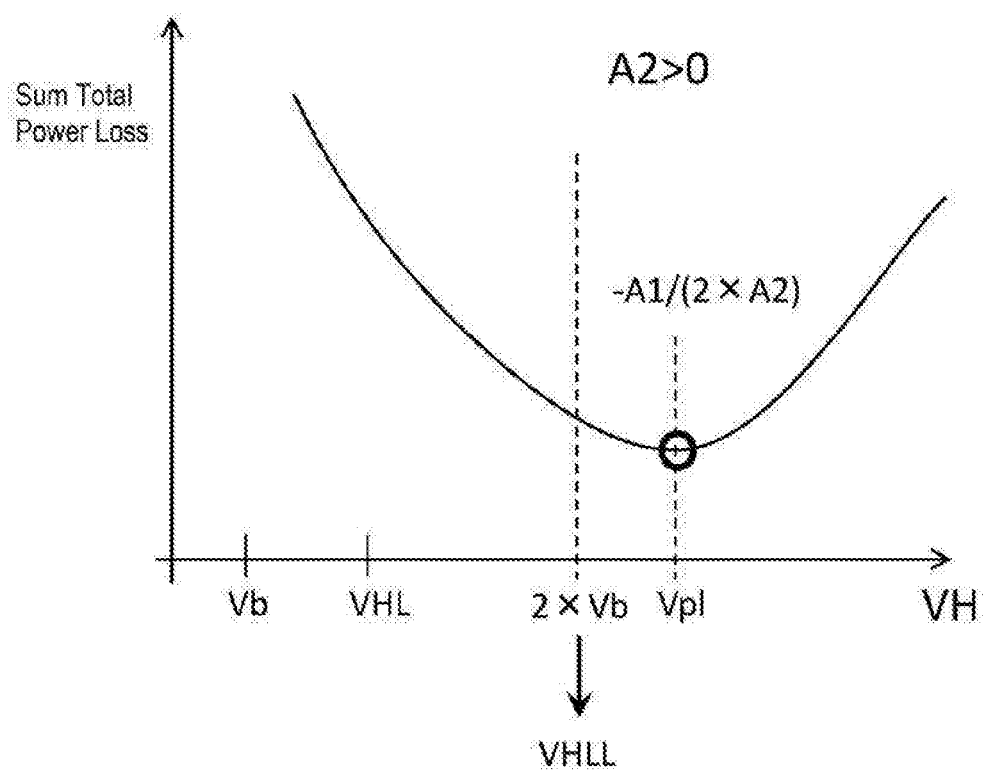
FIG. 14 is a figure for explaining a setting of the voltage command value according to a position of the extremum voltage according to Embodiment 1 of the present invention.

In the step ST171, as shown in FIG. 14, in the case where the extremum voltage Vpl is larger than the double value 2×Vb of the power source voltage, the loss minimum command calculation unit 802 sets the double value 2×Vb of the power source voltage as the low loss voltage VHLL. This is because the power loss of the converter 15 will become large if the system voltage VH becomes larger than the double value 2×Vb of the power source voltage, as explained using FIG. 8.

In the step ST150, the loss minimum command calculation unit 802 determines whether or not the extremum voltage Vpl is smaller than the required minimum voltage VHL; in the case where the extremum voltage Vpl is smaller, advances to the step ST172; in the case where the extremum voltage Vpl is not smaller, advances to step ST173.

Figure 15:
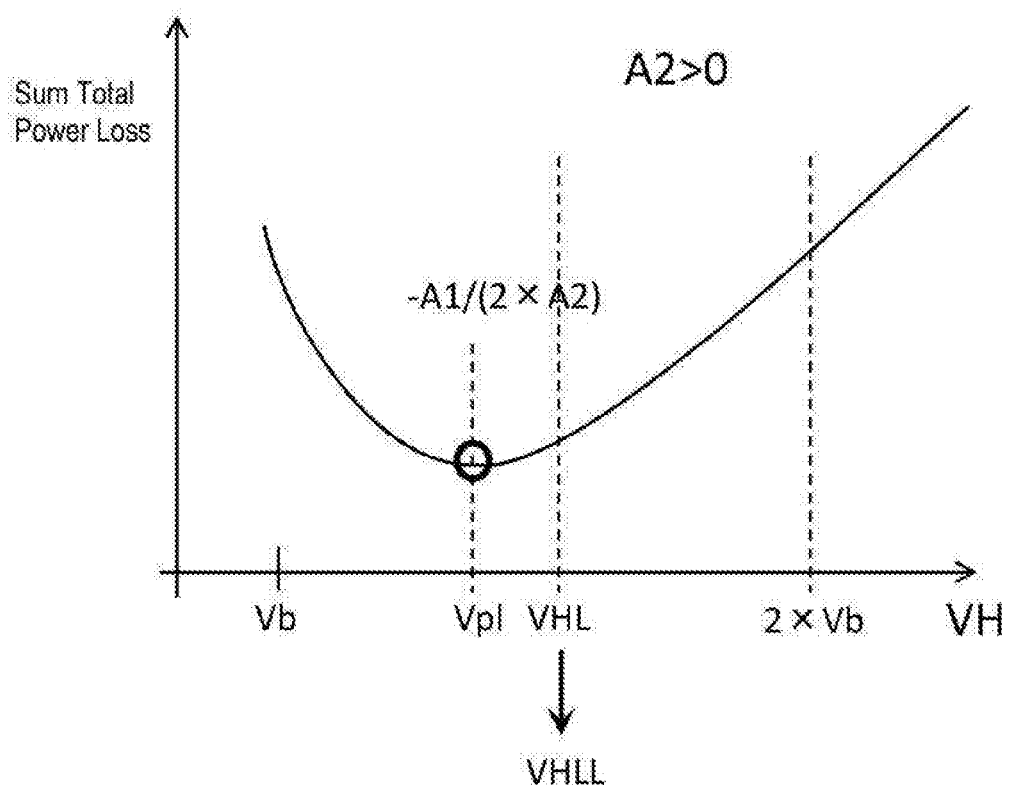
FIG. 15 is a figure for explaining a setting of the voltage command value according to a position of the extremum voltage according to Embodiment 1 of the present invention.

In the step ST172, as shown in FIG. 15, in the case where the extremum voltage Vpl is smaller than the required minimum voltage VHL, the loss minimum command calculation unit 802 sets the required minimum voltage VHL as the low loss voltage VHLL. This is because the sum total power loss becomes a minimum at the required minimum voltage VHL within a settable range of the voltage command value VH# which is larger than the required minimum voltage VHL.

In the step ST173, as shown in FIG. 16, in the case where the extremum voltage Vpl is within the range from the required minimum voltage VHL to the double value 2×Vb of the power source voltage, the loss minimum command calculation unit 802 sets the extremum voltage Vpl as the low loss voltage VHLL. This is because the sum total power loss becomes a minimum at the extremum voltage Vpl.

In the case where it is determined that the 2nd-order sum total loss coefficient A2 is 0 or a negative value in step the ST130, the loss minimum command calculation unit 802 determines either smaller one out of the sum total power loss at the required minimum voltage VHL and the sum total power loss at the double value 2×Vb of the power source voltage, based on the sum total loss coefficient, in the step ST160. In the present embodiment, as shown in FIG. 17A and FIG. 17B, the loss minimum command calculation unit 802 determines whether or not the extremum voltage Vpl, which is the system voltage VH from which the sum total power loss becomes a maximum, is smaller than an average voltage Vave of the required minimum voltage VHL and the double value 2×Vb of the power source voltage; in the case where the extremum voltage Vpl is smaller, advances to the step ST174; in the case where the extremum voltage Vpl is not smaller, advances to the step ST175. The loss minimum command calculation unit 802 calculates the average voltage Vave using a next equation.

$$Vave = (VHL + 2 \times Vb)/2 \quad (10)$$

As shown in FIG. 17A and FIG. 17B, in the case where the extremum voltage Vpl is smaller than the average voltage Vave, it can be estimated that the sum total power loss becomes a minimum at the double value 2×Vb of the power source voltage; and in the case where the extremum voltage Vpl is larger than the average voltage Vave, it can be estimated that the sum total power loss becomes a minimum at the required minimum voltage VHL.

Therefore, in the step ST174, in the case where the extremum voltage Vpl is smaller than the average voltage Vave, the loss minimum command calculation unit 802 sets the double value 2×Vb of the power source voltage as the low loss voltage VHLL. On the other hand, in the step ST175, in the case where the extremum voltage Vpl is larger than or equal to the average voltage Vave, the loss minimum command calculation unit 802 sets the required minimum voltage VHL as the low loss voltage VHLL.

In the step ST160, the loss minimum command calculation unit 802 may calculate the sum total power loss Ploss (VHL) in the case where the system voltage VH is the required minimum voltage VHL and the sum total power loss Ploss (2×Vb) in the case where the system voltage VH is the double value 2×Vb of the power source voltage, using the calculation equation of the sum total power loss Ploss of the equation (8); and determine which is smaller.

In the case where it is determined that the required minimum voltage VHL is outside the range from the power source voltage Vb to the double value 2×Vb of the power source voltage and the required minimum voltage VHL is larger than the double value 2×Vb of the power source voltage in the step ST110, the loss minimum command calculation unit 802 determines whether or not the required minimum voltage VHL is smaller than the output upper limit voltage Vmax in the step ST165; and in the case where the required minimum voltage VHL is smaller, advances to the step ST176, in the case where the required minimum voltage VHL is not smaller, advances to the step ST177.

In the step ST176, in the case where the required minimum voltage VHL is within the range from the double value 2×Vb of the power source voltage to the output upper limit voltage Vmax, the loss minimum command calculation unit 802 sets the required minimum voltage VHL as the low loss voltage VHLL. This is because the sum total power loss becomes a minimum at the required minimum voltage VHL within the settable range of the voltage command value VH# which is larger than the required minimum voltage VHL.

On the other hand, in the step ST177, in the case where the required minimum voltage VHL is larger than or equal to the output upper limit voltage Vmax, the loss minimum command calculation unit 802 sets the output upper limit voltage Vmax as the low loss voltage VHLL.

<Algorithm Selection Unit 803>

As the output (output power) of the converter 15 becomes large, the power loss characteristic of the converter 15 approaches the monotone increase characteristic, which the power loss increases in monotone to the increase of the system voltage VH, from the characteristic shown in FIG. 8. Therefore, if the output of the converter 15 becomes larger than a predetermined level, the sum total power loss becomes a minimum at the required minimum voltage VHL.

Then, in the present embodiment, as shown in FIG. 4 and FIG. 18, the voltage command calculation unit 700 is provided with an algorithm selection unit 803 that, in the case where the output (output power) of the converter 15 becomes larger than or equal to a preliminarily set determining output Pmg_th, replaces with the voltage command value VH# (the low loss voltage VHLL) which the loss minimum command calculation unit 802 sets, and sets the required minimum voltage VHL as the final voltage command value VH#.

The algorithm selection unit 803 is provided with a rotary electric machine output calculation unit 801 which calculates an output Pmg of the rotary electric machine MG. In the present embodiment, the first rotary electric machine output calculation unit 801 calculates an output Pmg1 of the first rotary electric machine MG1 based on the first torque command value Tqcom1 and the rotational speed ω1 of the first rotary electric machine MG1 (for example, Pmg1=Tqcom1×ω1). The second rotary electric machine output calculation unit 801 calculates an output Pmg2 of the second rotary electric machine MG2 based on the second torque command value Tqcom2 and the rotational speed ω2 of the second rotary electric machine MG2 (for example, Pmg2=Tqcom2×ω2).

The algorithm selection unit 803 is provided with a maximum value selection unit 910 that selects either larger one out of an absolute value of the output Pmg1 of the first rotary electric machine MG1 and an absolute value of the output Pmg2 of the second rotary electric machine MG2, and outputs the larger one as a maximum rotary electric machine output Pmg_max. The maximum value selection unit 910 may output an absolute value of a total value of the output Pmg1 of the first rotary electric machine MG1 and the output Pmg2 of the second rotary electric machine MG2, as the maximum rotary electric machine output Pmg_max.

In the case where the maximum rotary electric machine output Pmg_max is larger than or equal to the determining output Pmg_th, the algorithm selection unit 803 outputs the low loss voltage VHLL which the loss minimum command calculation unit 802 set as the final voltage command value VH# directly; and in the case where the maximum rotary electric machine output Pmg_max is smaller than the determining output Pmg_th, the algorithm selection unit 803 outputs the required minimum voltage VHL as the final voltage command value VH#.

SUMMARY

According to the above configuration, about each of a plurality of voltage candidates, without calculating each power loss using map data of power loss characteristic and without searching for the voltage command value from which the sum total power loss becomes a minimum; based on the coefficient of the polynomial representing each power loss characteristic, it is possible to calculate by determination logic and simple calculation equation, and reduce data-processing load. Although map data is used for calculation of the coefficient of each order, since the value corresponding to the present operating condition is only read once from map data, it is not necessary to perform a calculation using map data about each of a plurality of voltage candidates. Since each power loss characteristic is approximated by the simple 2nd-order polynomial, the amount of memories of the storage apparatus can be significantly reduced rather than converting the power loss characteristic into map data directly. For example, in the case where the system voltage VH changes from 150V to 650V, if data table of the power loss characteristic is prepared by 50V unit, ten sets of data table are necessary; but, if approximated with the quadratic equation, the number of data tables can be reduced to three sets for coefficients (minimum two sets in the case using only the coefficients A2, A1). In the present embodiment, since the voltage command value VH# is set using the extremum voltage Vpl calculated based on the 2nd-order and the 1st-order sum total loss coefficients A2, A1, it is not necessary to perform a calculation of the power loss using the polynomial about each of a plurality of voltage candidates, and can reduce data-processing load. Therefore, while reducing data-processing load, the sum total power loss of the rotary electric machine drive apparatus 1000 can be reduced.

Embodiment 2

The controller 400 of the rotary electric machine drive apparatus 1000 according to Embodiment 2 is explained. The explanation for constituent parts the same as those in Embodiment 1 will be omitted. The basic configuration of the controller 400 according to the present embodiment is the same as that of Embodiment 1; however, Embodiment 2 is different from Embodiment 1 in that the voltage command value VH# is set so that a resonance voltage which a resonance of the rotary electric machine drive apparatus 1000 occurs is avoided.

In the case where the voltage command value VH# set by above-mentioned Embodiment 1 is used as it is, depending on selection of a constant of the inductance and the capacitor which are used for the converter 15, and selection of an operating point, ripple of voltage and current of the converter 15 may cause by the LC resonance of the converter 15. Thus, it is desired to calculate the voltage command value VH# for suppressing the LC resonance of the converter 15, while reducing the sum total power loss of the rotary electric machine drive apparatus 1000 as much as possible.

Then, in the present embodiment, the voltage command calculation unit 700 performs a lower limit to the voltage command value VH# which the loss minimum command calculation unit 802 set, by a resonance avoidance voltage VHLC which is preliminarily set to a larger value than a resonance voltage command value which is the voltage command value VH# which causes a resonance of the rotary electric machine drive apparatus 1000, and sets a value performed the lower limit as the final voltage command value VH#.

Figure 19:
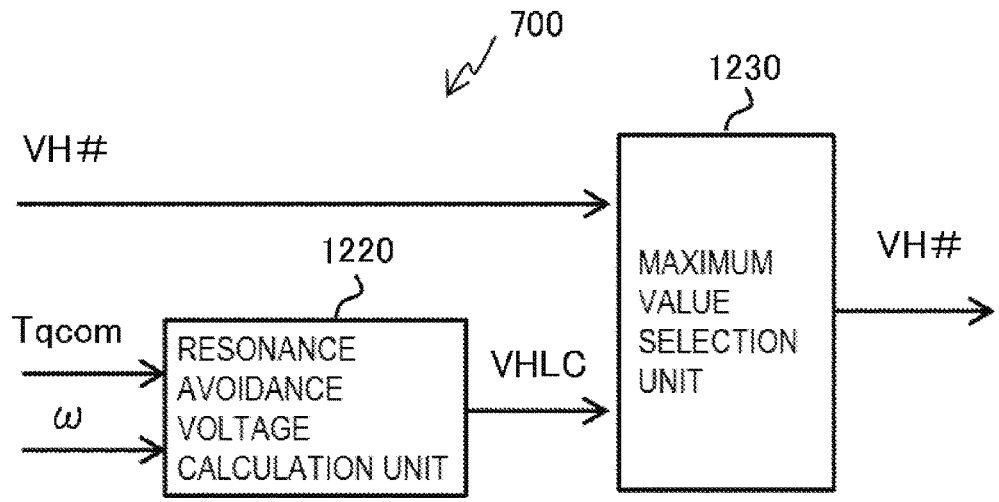
FIG. 19 is a block diagram of a voltage command calculation unit according to Embodiment 2 of the present invention.

As shown in FIG. 19, the voltage command calculation unit 700 is provided with a resonance avoidance voltage calculation unit 1220 which calculates the resonance avoidance voltage VHLC. The resonance avoidance voltage calculation unit 1220 calculates the resonance avoidance voltage VHLC corresponding to the present torque command value Tqcom and the present rotational speed ω of the rotary electric machine MG, by use of a map data in which a relationship among the torque command value Tqcom, the rotational speed ω of the rotary electric machine MG, and the resonance avoidance voltage VHLC is preliminarily set.

The voltage command calculation unit 700 is provided with a maximum value selection unit 1230 that select either larger one out of the voltage command value VH# which is calculated by the same method as the above-mentioned Embodiment 1, and the resonance avoidance voltage VHLC, and output the lager one as the final voltage command value VH#.

According to the above configuration, the LC resonance can be suppressed, while maintaining the effect of Embodiment 1 as much as possible.

Embodiment 3

The controller 400 of the rotary electric machine drive apparatus 1000 according to Embodiment 3 is explained. The explanation for constituent parts the same as those in each of Embodiments 1 and 2 will be omitted. The basic configuration of the controller 400 according to the present embodiment is the same as that of Embodiment 1 and 2; however, Embodiment 3 is different from Embodiment 1 and 2 in that the voltage command value VH# is set so that a preliminarily set avoidance voltage range is avoided.

In the case where the voltage command value VH# calculated in Embodiment 1 and 2 is used as it is, depending on selection of a constant of the inductance and the capacitor which are used for the converter 15 and selection of an operating point, in the case where the system voltage VH is close to the power source voltage Vb, oscillation may cause in the system voltage VH. Then, in the case where the voltage command value VH#, which the loss minimum command calculation unit 802 set, becomes within a preliminarily set avoidance voltage range, the voltage command calculation unit 700 sets a voltage outside the avoidance voltage range as the final voltage command value VH#. The voltage command calculation unit 700 calculates the avoidance voltage range based on the torque command value Tqcom, the rotational speed ω of the rotary electric machine MG, the power source voltage Vb, the maximum rotary electric machine output Pmg_max, and the like, by use of setting data such as a preliminarily set map data. The voltage command calculation unit 700 calculates the range from the power source voltage Vb to a voltage (Vb+ΔVth) which added a preliminarily set ΔVth to the power source voltage Vb, as the avoidance voltage range; and in the case where the voltage command value VH# enters within the avoidance voltage range, sets Vb+ΔVth as the voltage command value VH#. According to this configuration, the oscillation of the system voltage VH can be suppressed, while maintaining the effect of Embodiments 1 and 2 as much as possible.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In each of above-mentioned embodiments, there has been explained the case where the rotary electric machine MG and the inverters IN are provided 2 sets, and the controller 400 is configured so as to adapt to the first set and the second set. However, the rotary electric machine MG and the inverter IN may be provided 1 set, 3 sets, or more than 3 sets. The controller 400 is appropriately configured so as to adapt to the number of sets.

(2) In each of above-mentioned embodiments, there has been explained the case where each of the polynomials is a polynomial whose order is the 2nd-order. However, each of the polynomials may be a polynomial whose order is higher than or equal to the 3rd-order.

(3) In each of above-mentioned embodiments, there has been explained the case where the loss minimum command calculation unit 802 calculates the inverter loss coefficient which is a coefficient of a polynomial in which the system voltage VH is a variable and which represents a power loss characteristic of the inverter IN and the rotary electric machine MG. However, the loss minimum command calculation unit 802 may calculate the inverter loss coefficient which is a coefficient of a polynomial in which the system voltage VH is a variable and which represents a power loss characteristic of only the inverter IN. The loss minimum command calculation unit 802 may further calculate the loss coefficient of the rotary electric machine which is a coefficient of a polynomial in which the system voltage VH is a variable and which represents a power loss characteristic of the rotary electric machine MG, and calculate a sum total of the converter loss coefficient, the inverter loss coefficient, and the loss coefficient of the rotary electric machine as the sum total loss coefficient for each order of the polynomials.

(4) In each of above-mentioned embodiments, there has been explained the case where the loss minimum command calculation unit 802 calculates the 1st-order, the 2nd-order and the 3rd-order of the converter loss coefficients, the first inverter loss coefficients, the second inverter loss coefficients, and the sum total loss coefficients. However, since the loss minimum command calculation unit 802 does not use each zero-order loss coefficient in the processing explained using the flow chart of FIG. 9, the loss minimum command calculation unit 802 may not calculate the zero-order of the converter loss coefficient, the first inverter loss coefficient, the second inverter loss coefficient, and the sum total loss coefficient.

(5) In each of above-mentioned embodiments, there has been explained the case where the loss minimum command calculation unit 802 calculates the extremum voltage Vpl based on the 2nd-order and the 1st-order of the sum total loss coefficients A2, A1, and sets the voltage command value VH# using the extremum voltage Vpl. However, about each of a plurality of voltage candidates, the loss minimum command calculation unit 802 may calculate the sum total power loss Ploss using the polynomial which used the sum total loss coefficient which represents the sum total power loss characteristic as shown in the equation (8); and search a voltage which the sum total power loss Ploss becomes a minimum and set the low loss voltage VHLL. In this case, since it is the calculation using only one polynomial, data-processing load can be significantly reduced rather than the calculation using the map data which represents each power loss.

(6) In each of above-mentioned embodiments, the calculation example of the approximate equation and the coefficient about the converter 15, the inverter IN, and the rotary electric machine MG only showed the representative example, and can be calculated based on other method or other variables. In the case where the number of the converter 15, the number of the inverter IN, and the number of the rotary electric machine MG increase, these loss property can be approximated in the same manner, a coefficient can be calculated in the same manner, and the voltage command value VH# which the power loss becomes a minimum can be set according to the flow chart shown in FIG. 9.

(7) Among the power loss of a converter, the power loss of an inverter, and the power loss of a rotary electric machine, only about some limited losses where the change degree to change of the system voltage VH is large, the coefficient in the case of approximating power loss by a polynomial may be calculated, and based on the calculated coefficient, the low loss voltage VHLL which power loss becomes a minimum may be set.

(8) In each of above-mentioned embodiments, there has been explained the case where the converter 15 is provided with the two switching devices Q3, Q4 for the voltage boosting chopper, and is provided with the two switching devices Q1, Q2 for the voltage dropping chopper. However, a circuit configuration may be changed. For example, the converter 15 may be provided with one switching device for the voltage boosting chopper, and may be provided with one switching device for the voltage dropping chopper.

(9) In each of above-mentioned embodiments, there has been explained the case where the rotary electric machine drive apparatus 1000 is mounted in the hybrid vehicle. However, the rotary electric machine drive apparatus 1000 may be a driving force source of other apparatus other than the hybrid vehicle, such as being mounted in an electric vehicle.

Various modifications and alterations of this invention will be apparent to those skilled in the art without departing from the scope and spirit of this invention, and it should be understood that this is not limited to the illustrative embodiments set forth herein.

What is claimed is:

1. A controller for a rotary electric machine drive apparatus that is provided with a converter which can raise a power source voltage of a direct current power source to output to a system voltage line, and an inverter which is provided between the converter and a rotary electric machine and performs power conversion between direct current power of the system voltage line and alternating current power which drives the rotary electric machine, the controller for the rotary electric machine drive apparatus comprising:

a converter controller that controls the converter so that a system voltage which is a direct current voltage of the system voltage line approaches a voltage command value, in the case where the voltage command value is larger than the power source voltage; and a voltage command calculator which calculates the voltage command value within a range which is larger than or equal to the power source voltage and is smaller than or equal to an output upper limit voltage of the converter;

wherein the voltage command calculator is provided with a required minimum voltage calculator that calculates a required minimum voltage which is a minimum system voltage required in the case of performing a maximum torque/current control of the rotary electric machine under conditions of the present torque command value and the present rotational speed of the rotary electric machine; and a loss minimum command calculator that, in the case where the required minimum voltage is larger than or equal to the power source voltage and is smaller than or equal to the output upper limit voltage of the converter, calculates a converter loss coefficient which is a coefficient of a polynomial in which the system voltage is a variable and represents a power loss characteristic of the converter; calculates an inverter loss coefficient which is a coefficient of a polynomial in which the system voltage is a variable and represents a power loss characteristic of the inverter; calculates a sum total of the converter loss coefficient and the inverter loss coefficient for each order of the polynomials; based on the calculated sum total loss coefficient for each order, calculates a low loss voltage which is the system voltage from which a sum total power loss of the converter and the inverter becomes a minimum, within a candidate voltage range which is larger than or equal to the required minimum voltage and is smaller than or equal to the output upper limit voltage of the converter; and sets the low loss voltage as the voltage command value.

2. The controller for the rotary electric machine drive apparatus according to claim 1, wherein the loss minimum command calculator calculates the converter loss coefficient corresponding to the present power source voltage and a present output of the converter, about each order, by use of a relation characteristic in which a relationship among the power source voltage, the output of the converter, and the converter loss coefficient is preliminarily set; and calculates the inverter loss coefficient corresponding to the present torque command value and the present rotational speed of the rotary electric machine, about each order, by use of a relation characteristic in which a relationship among an output torque of the rotary electric machine, the rotational speed of the rotary electric machine and the inverter loss coefficient is preliminarily set.

3. The controller for the rotary electric machine drive apparatus according to claim 1, wherein a plurality of sets of the rotary electric machine and the inverter are provided, wherein the required minimum voltage calculator calculates an individual required voltage which is the minimum system voltage required in the case of performing a maximum torque/current control of the rotary electric machine, about each of the rotary electric machines, under conditions of the present torque command value and the present rotational speed of the rotary electric machine; and sets a maximum value out of the individual required voltages in each of the rotary electric machine as the required minimum voltage, and wherein the loss minimum command calculator calculates the inverter loss coefficient about each of the inverters and calculates the sum total of the converter loss coefficient and the inverter loss coefficient of each of the inverters for every order of the polynomial.

4. The controller for the rotary electric machine drive apparatus according to claim 1, wherein the required minimum voltage calculator, in the case where the required minimum voltage is larger than or equal to the power source voltage and is smaller than or equal to a double value of the power source voltage, calculates the sum total loss coefficient whose maximum order is the 2nd order, and determines whether or not the sum total loss coefficient of the 2nd-order is a positive value; in the case of determining that the sum total loss coefficient of the 2nd-order is a positive value, calculates an extremum voltage which is the system voltage from which the sum total power loss of the converter and the inverter becomes a minimum based on the sum total loss coefficient of the 2nd-order and the 1st-order, and then in the case where the extremum voltage is larger than the double value of the power source voltage, sets the double value of the power source voltage as the low loss voltage, or in the case where the extremum voltage is smaller than the required minimum voltage, sets the required minimum voltage as the low loss voltage, or in the case where the extremum voltage is within a range between the required minimum voltage and the double values of the power source voltage, sets the extremum voltage as the low loss voltage; in the case of determining that the sum total loss coefficient of the 2nd-order is not a positive value, determines either smaller one of the required minimum voltage and the double value of the power source voltage based on the sum total loss coefficient and sets the smaller one as the low loss voltage;
in the case where the required minimum voltage is larger than the double value of the power source voltage, sets the required minimum voltage as the low loss voltage;
in the case where the required minimum voltage is larger than the output upper limit voltage of the converter, sets the output upper limit voltage of the converter as the low loss voltage.

5. The controller for the rotary electric machine drive apparatus according to claim 1, wherein the voltage command calculator is provided with an algorithm selection unit that, in the case where the output of the converter becomes larger than or equal to a preliminarily set determining output, replaces with the voltage command value which the loss minimum command calculator sets, and sets the required minimum voltage as the final voltage command value.

6. The controller for the rotary electric machine drive apparatus according to claim 1, wherein the loss minimum command calculator calculates the inverter loss coefficient which is a coefficient of a polynomial in which the system voltage is a variable and which represents a power loss characteristic of the rotary electric machine in addition to the inverter.

7. The controller for the rotary electric machine drive apparatus according to claim 1, wherein the loss minimum command calculator calculates a loss coefficient of the rotary electric machine which is a coefficient of a polynomial in which the system voltage is a variable and which represents a power loss characteristic of the rotary electric machine, and calculates a sum total of the converter loss coefficient, the inverter loss coefficient, and the loss coefficient of the rotary electric machine as the sum total loss coefficient for each order of the polynomials.

8. The controller for the rotary electric machine drive apparatus according to claim 1, wherein each of the polynomials is a polynomial whose order is smaller than or equal to the 2nd-order.

9. The controller for the rotary electric machine drive apparatus according to claim 1, wherein the coefficient in each of the polynomials is preliminarily set using the least square method.

10. The controller for the rotary electric machine drive apparatus according to claim 1, wherein the coefficient in each of the polynomials is preliminarily set based on each power loss data for a range of the system voltage between the power source voltage and the double value of the power source voltage.

11. The controller for the rotary electric machine drive apparatus according to claim 1, wherein the voltage command calculator performs a lower limit to the voltage command value which the loss minimum command calculator set, by a resonance avoidance voltage which is preliminarily set to a larger value than a resonance voltage command value which is the voltage command value which causes a resonance of the rotary electric machine drive apparatus, and sets a value performed the lower limit as the final voltage command value.

12. The controller for the rotary electric machine drive apparatus according to claim 1, wherein the voltage command calculator, in the case where the voltage command value which the loss minimum command calculator set becomes within a preliminarily set avoidance voltage range, sets a voltage outside the avoidance voltage range as the final voltage command value.

\* \* \* \* \*